(12) United States Patent
Holmes et al.

(10) Patent No.: US 9,547,295 B2
(45) Date of Patent: Jan. 17, 2017

(54) METHODS AND APPARATUS TO DISPLAY PROCESS CONTROL DEVICE INFORMATION

(75) Inventors: David Farrell Holmes, Chanhassen, MN (US); Dale Henry Perry, Burnsville, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 500 days.

(21) Appl. No.: 12/890,289

(22) Filed: Sep. 24, 2010

(65) Prior Publication Data

US 2012/0078386 A1    Mar. 29, 2012

(51) Int. Cl.
G05B 15/02 (2006.01)
G05B 19/042 (2006.01)

(52) U.S. Cl.
CPC ... *G05B 19/042* (2013.01); *G05B 2219/23084* (2013.01)

(58) Field of Classification Search
USPC ........................................................ 700/17
See application file for complete search history.

(56) References Cited

U.S. PATENT DOCUMENTS

| | | | |
|---|---|---|---|
| 5,404,441 A | 4/1995 | Satoyama | |
| 5,818,446 A | 10/1998 | Bertram et al. | |
| 6,216,138 B1 | 4/2001 | Wells et al. | |
| 6,298,454 B1 | 10/2001 | Schleiss et al. | |
| 6,490,493 B1 | 12/2002 | Dharnipragada | |
| 6,763,515 B1 | 7/2004 | Vazquez et al. | |
| 6,778,979 B2 | 8/2004 | Grefenstette et al. | |
| 7,783,370 B2* | 8/2010 | Nixon et al. | 700/83 |
| 7,870,153 B2* | 1/2011 | Croft | G06F 3/1415 707/694 |
| 2002/0010562 A1 | 1/2002 | Schleiss et al. | |
| 2005/0144183 A1 | 6/2005 | McQuown et al. | |
| 2005/0171661 A1 | 8/2005 | Abdel-Malek et al. | |
| 2005/0172261 A1 | 8/2005 | Yuknewicz et al. | |
| 2005/0235260 A1 | 10/2005 | Matsutsuka et al. | |
| 2005/0273230 A1 | 12/2005 | Steinmeier et al. | |
| 2006/0143570 A1 | 6/2006 | Washington et al. | |
| 2006/0212174 A1 | 9/2006 | Garmon et al. | |
| 2006/0218507 A1 | 9/2006 | K et al. | |
| 2007/0132779 A1 | 6/2007 | Gilbert et al. | |
| 2007/0139441 A1 | 6/2007 | Lucas et al. | |

(Continued)

FOREIGN PATENT DOCUMENTS

| | | |
|---|---|---|
| EP | 0 813 131 | 12/1997 |
| EP | 1 906 279 | 4/2008 |
| WO | 2010037145 | 4/2010 |

OTHER PUBLICATIONS

"The Foundation fieldbus PRIMER", Revision 1.1, Fieldbus 2001.*

(Continued)

*Primary Examiner* — Carlos Ortiz Rodriguez
(74) *Attorney, Agent, or Firm* — Hanley, Flight & Zimmerman, LLC

(57) ABSTRACT

An example method includes receiving a conditional device parameter in a processor from a process control device, determining if functionality associated with the process control device is available, where the conditional device parameter indicates if the functionality is available, and displaying the conditional device parameter within a graphic via a user interface if the functionality is available.

18 Claims, 12 Drawing Sheets

(56) References Cited

U.S. PATENT DOCUMENTS

2007/0157087 A1    7/2007  Foerg et al.
2008/0269916 A1   10/2008  Malone et al.

OTHER PUBLICATIONS

Kastner et al., "EDDL inside FDT/DTM", IEEE 2004.*
Patent Cooperation Treaty, International Search Report and Written Opinion, issued for patent application serial No. PCT/US2011/052570, mailed on Dec. 22, 2011, 14 pages.
European Patent Office, "Communication pursuant to Article 94(3) EPC", issued in connection with European Patent application No. 11 769 970.2, Aug. 18, 2015, 5 pages.
European Patent Office, "Summons to Attend Oral Proceedings Pursuant to Rule 115(1) EPC", issued in connection with European Patent application No. 11 769 970.2, Jun. 22, 2016, 6 pages.
Patent Cooperation Treaty, "International Preliminary Report on Patentability," issued for patent application serial No. PCT/US2011/052570, mailed on Mar. 26, 2013, 9 pages.

* cited by examiner

METHODS AND APPARATUS TO DISPLAY PROCESS CONTROL DEVICE INFORMATION

FIELD OF THE DISCLOSURE

The present disclosure relates generally to process control systems and, more particularly, to methods and apparatus to display process control device information.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more applications (i.e., routines, programs, etc.) as runtime data executed by the operator workstation (e.g., a processor-based system) to enable an operator to perform desired functions with respect to the process. Some of these functions may include viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Many current field devices, for example, field devices associated with the Foundation Fieldbus™ protocol include configuration block(s). To configure these field devices to operate in a specified mode, each of the configuration block(s) is individually programmed and/or defined to operate in a mode. Further, many field devices may have multiple components, with each of the components including configuration block(s). To configure these multiple components in a field device for a particular mode, configuration block(s) for each of the components is programmed and/or defined to operate in a mode. Additionally, some of these components may only be operational based on a specified configuration of the field device. For example, an unlicensed component may be deactivated and/or unavailable.

SUMMARY

Example methods and apparatus to display process control device information are described. In one example, a method includes receiving a conditional device parameter in a processor from a process control device and determining if functionality associated with the process control device is available, wherein the conditional device parameter indicates if the functionality is available. The example method also includes displaying the conditional device parameter within a graphic via a user interface if the functionality is available.

An example apparatus includes a runtime data receiver to receive a conditional device parameter from a process control device. The example apparatus also includes a conditional graphic manager to determine if at least one graphic associated with the conditional device parameter is to be displayed within a user interface based on information included within the conditional device parameter.

DETAILED DESCRIPTION

Figure 1:
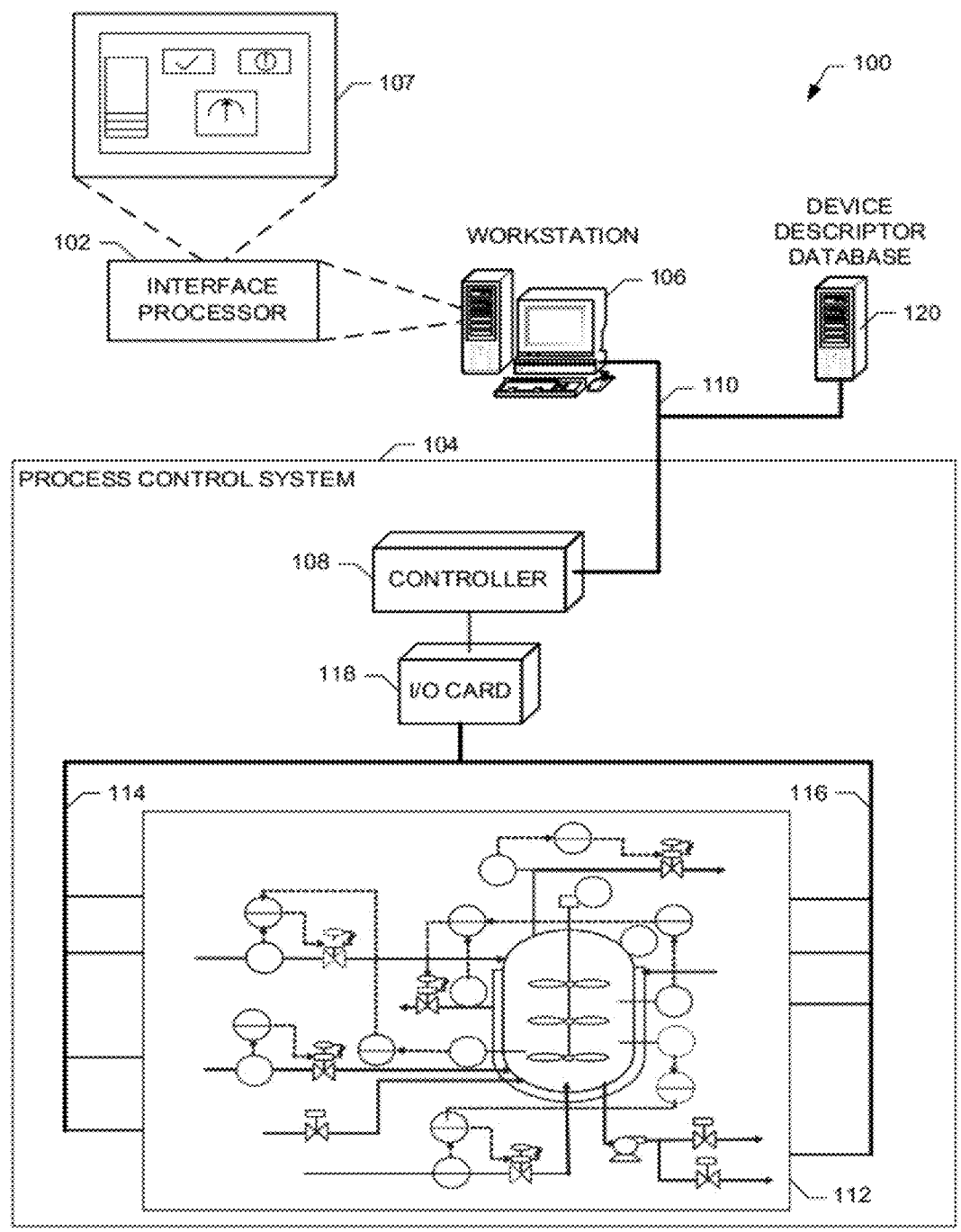
FIG. 1 shows a block diagram illustrating an example process control system including an example interface processor.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with displaying process control device (e.g., field device) information, the example methods and apparatus are more generally applicable and may be implemented to display process control device information for any automation system, batch processing system, manufacturing system, industrial control system, safety instrumented system, etc. Throughout the following patent, components, configuration blocks, block mode elements, features and/or functions are collectively referred to as objects.

Process control systems generally include controllers to operate routines, control strategies, and/or algorithms that manage field devices. The field devices may be, for example, valves, valve positioners, switches and transmitters, and may perform process control functions such as opening or closing valves and measuring process control parameters. These field devices may perform a single function or, alternatively, may perform multiple functions. In addition to managing field devices, controllers generate runtime data (e.g., process control information) based on data received from the field devices. The runtime data may include process values, statistics, alarms, monitoring information, process trend information, diagnostic information, configuration information, field device status information, and/or messages from the field devices.

In many process control systems, runtime data is displayed as graphics within a user interface. The graphics may include charts, gauges, graphs, menus, tabs, data fields, indicators, tables, etc. In many instances, graphics within a user interface are designed and/or configured by system designers, process control personnel, and/or interface engineers. The graphics provide a numerical and/or pictorial representation of the runtime data that operators, engineers and/or other process control personnel use to manage and control a process control system. Some of the graphics are used to display statuses (e.g., modes) of field devices within the process control system. Process control personnel may use the graphical representation of a field device mode to determine if the device is operating as specified. If the personnel determine that the device is not operating as specified, the personnel may adjust the device through controls displayed on the user interface. In other instances, personnel may have to troubleshoot an issue at the location of the device. Thus, displaying a mode of a process control device is useful to personnel for managing a process control system.

To display a mode of a field device (e.g., a device mode), many process control systems display a mode for each component (e.g., a component mode) of the field device and may display a mode for each of the configuration blocks (e.g., a configuration mode) associated with each component. A component of a field device is a functional and/or structural portion of the field device that may be combined and/or coupled to other components. For example, a pneumatic valve may include an actuator component, a gauge component, and/or a sensor component. In some examples, a field device may not be partitioned into components. In these examples, process control systems display a mode for each configuration block associated with the field device. A configuration block is a parameterized definition of one or more features and/or functions of a field device and/or component. A configuration block may be implemented by software and/or embedded hardware. Typically field devices include at least one resource configuration block that specifies parameters (e.g., hardware specific characteristics) that are common among other configuration blocks within a field device. Field devices may also contain one or more transducer configuration blocks, which function as a data interface between a sensor and/or an actuator within a field device. Many transducer configuration blocks may specify calibration and/or linearization functions for a sensor and/or an actuator within a field device. Further, field devices may include one or more functional configuration blocks that define monitoring and/or control functionality of a field device and/or components within a field device. Functional configuration block receive and/or transmit data to sensors and/or actuators within a field device via transducer configuration blocks.

Some configuration blocks (e.g., a transducer configuration block) may be fixed by a manufacturer and provide an operational definition of how a component and/or field device operates. For example, a transducer configuration block for a valve actuator defines an algorithm for moving the actuator based on inputs and/or feedback. Alternately, some configuration blocks (e.g., a resource configuration block and/or a functional configuration block) may be defined and/or specified by a user. For example, a functional configuration block may include calibration information that defines a relationship between a valve controller and a process control system.

In an example, an environment sensor (e.g., a field device) may include a temperature sensor component and a pressure sensor component. The temperature sensor component may be defined and/or configured by a first transducer configuration block and a first functional configuration block. Similarly, the pressure sensor component may be defined and/or configured by a second transducer configuration block and a second functional configuration block. The environmental sensor may be defined and/or configured by a resource configuration block. In other examples, the temperature sensor and the pressure sensor may be defined and/or configured by a transducer configuration block and a functional configuration block. The modes of the configuration blocks are based on statuses of block mode elements.

In many process control field devices, block mode elements are industry standardized parameters for defining a mode of a configuration block. A mode defines an operational status of a configuration block. For example, a mode may indicate a normal operating status, an error status, a calibration status, etc. The block mode elements include, for example, a target element that indicates a mode of a configuration block specified (e.g., requested) by a user, an actual element that indicates a current mode of a configuration block, and/or a normal element that indicates a mode in which a configuration block operates under standard operating process control conditions. The block mode elements may have statuses that include, for example, remote-output, remote cascade, cascade, automatic, manual, local override, initialization manual, and/or out-of-service. In other examples, a mode of a configuration block may be based on fewer or additional block mode elements. In some examples, statuses of block mode elements may be specified by a user, a process control application operating on a workstation, and/or a controller.

Further, in some examples, a user may change an operating condition of a configuration block by changing a target block mode element. The user may then determine if the configuration block within a field device accepted the change by reading the actual block mode element. If the target block mode element and the actual block mode element have the same status, then generally the configuration block is operating in accordance a desired condition of the user.

In many user interfaces, a device mode of a field device is based on individually textually displayed statuses of block mode elements of configuration blocks included within the field device. The user interfaces typically display the mode of the field device in this manner because some process control communication protocols (e.g., the Foundation Fieldbus™ communication protocol) specify that communication with field devices regarding operational status occurs at the configuration block level. In other words, control of a field device is based on managing statuses of block mode elements within configuration blocks for each component. In an example, to ensure a field device is operating in a normal operating state, a user checks the actual block mode element of each of configuration block within each component of a field device. For a field device with multiple components, with each component defined by multiple configuration blocks, a user may have to determine an operating mode of the field device by locating within a user interface (and/or multiple user interfaces) statuses of actual block mode elements for each of the configuration blocks. In addition to locating the actual block mode elements, a user may have to determine how to combine the statuses of the block mode elements to determine a mode of the field device. This may require specific knowledge of the field device, knowledge about a communication protocol of the field device, and/or knowledge about a process control system that includes the field device. As a result, checking the mode of a field device can be a relatively time consuming process.

In another example, if a user desires to change a state and/or mode of a field device, the user has to determine which target block mode elements within the configuration blocks need to be changed by locating the target block mode elements within a user interface. The user then has to determine to which state and/or status to change the target block mode elements. The user may then have to locate the actual block mode elements to ensure the configuration blocks were changed as specified in the target block mode elements.

The example methods and apparatus described herein enable a user to manage field devices by combining statuses of block mode elements to determine a mode of a configuration block. The example methods and apparatus function as an interface between field devices and a controller by determining a mode and displaying the mode as a graphic for a field device, component and/or configuration block based on process control status information of block mode elements. In this manner, the example methods and apparatus described herein enable a user to view a mode of a field device, component, and/or configuration block within a single graphic that is based on combining block mode elements for all of the configuration blocks within the field device. Further, the example methods and apparatus determine statuses of block mode elements needed to place a field device, component, and/or configuration block in a mode specified by a user.

More specifically, the example methods and apparatus described herein combine statuses of block mode elements by defining modes of a configuration block based on possible statuses of each of the block mode elements. Because many process control devices have similarly defined configuration blocks, the example methods and apparatus may be utilized for any field device that uses configuration blocks to report a mode. When a field device is installed within a process control system, the example methods and apparatus can display a field device mode graphic in a user interface by accessing stored configuration block definitions that specify modes. Further, the example methods and apparatus may define a mode of a component based on possible mode combinations of a configuration block. Similarly, the mode of a field device can be defined based on possible mode combinations of the components.

By displaying a mode of a field device, component, and/or configuration block as a graphic, the example methods and apparatus described herein reduce an amount of graphics displayed within a user interface, thereby making the user interface relatively more readable and intuitive to a user. Further, by reducing statuses of block mode elements into a mode of a configuration block, a component, and/or a field device, the example methods and apparatus described herein reduce possible errors from process control personnel calculating a mode of a field device by manually combining statuses of multiple actual block mode elements.

In addition to displaying a mode of a field device within a single graphic, the example methods and apparatus described herein use configuration block information to determine which components, functions, features, and/or configuration blocks of a field device are available. For example, in many known systems, some components of a field device may not be used by a process control system and/or may not be licensed or purchased. The example methods and apparatus described herein determine which of the components are not available and remove from applications graphics associated with the unavailable components. For example, an environment sensor (e.g., a field device) may include a temperature sensor component and a pressure sensor component. A process control system owner may only license the pressure sensor component. However, applications may display a gauge showing a temperature and a gauge showing a pressure. The example methods and apparatus described herein determine that only the pressure sensor component is licensed and remove the temperature gauge, thereby removing an unused graphic displayed within an application. Removing unused graphics provides a relatively easier to read application and prevents a user from mistakenly believing that a component feature, and/or function is malfunctioning.

FIG. 1 shows a diagram of an example process control environment 100 including an example interface processor 102 that maybe used to carry out the example methods and apparatus described herein. The example interface processor 102 is associated with a process control system 104. Additionally, the interface processor 102 may be implemented by and/or included within a workstation 106. In other examples, the interface processor 102 may be included within a server, a distributed computing network, and/or any other computing device(s) that may be communicatively coupled to the workstation 106.

The example workstation 106 of FIG. 1 may include any computing device such as a personal computer, a laptop, a server, a controller, a personal digital assistant (PDA), a computing pad, a micro computer, etc. The workstation 106 may be implemented using any suitable computer system or processing system (e.g., the processor system P10 of FIG. 13). For example, the workstation 106 could be implemented using a single processor personal computer, single or multi-processor workstations, etc.

The example workstation 106 displays applications via a user interface 107. The user interface 107 enables a user of the workstation 106 to graphically view (via an application)

process control information generated by a controller 108. Additionally, the example user interface 107 enables a user to manage the process control system 104 by providing graphical instrumentality that the user may select and/or manipulate to cause the workstation 106 to send instructions to the controller 108. The example user interface 107 also displays, via an application, mode information provided by the example interface processor 102.

The example process control system 104 may include any type of manufacturing facility, process facility, automation facility, safety instrumented facility, and/or any other type of process control structure or system. In some examples, the process control system 104 may include multiple facilities located at different locations within the process control environment 100. Additionally, the example process control environment 100 may include other process control systems (not shown) that may be included within the same facility and/or located at a different facility.

The example process control system 104 includes the controller 108 that may be communicatively coupled to the workstation 106 via a local area network (LAN) 110. The LAN 110 may be implemented using any communication medium and protocol. For example, the LAN 110 may be based on a hardwired or wireless Ethernet communication scheme. However, any other suitable communication medium and protocol could be used. Furthermore, although a single LAN 110 is shown, more than one LAN and appropriate communication hardware within the workstation 106 may be used to provide redundant communication paths between the workstation 106 and a respective similar workstation (not shown).

Additionally, the process control environment 100 may include routers (not shown) to communicatively couple other workstations (not shown) to the controller 108 and/or to communicatively couple the workstation 106 to controllers (not shown) within other process control systems. Further, the process control environment 100 may include a firewall (not shown) to provide remote workstations (e.g., workstations outside of the process control environment 100) access to resources within the process control environment 100.

The process control system 104 includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure sensors, concentration sensors, fluid level meters, flow meters, and/or vapor sensors to measure portions of a process. The field devices 112 receive instructions from the controller 108 via inputs 114 to execute a specified operation and cause a change to the process implemented and/or controlled by the field devices 112. The instructions may also cause a change to a mode of the field devices 112 by modifying block mode elements of configuration blocks. Furthermore, the field devices 112 measure process data, environmental data, and/or input device data and transmit the measured data via outputs 116 to the controller 108 as process control information. While the inputs 114 and the outputs 116 are shown as separate paths, in other examples, the inputs and the outputs 116 may share the same communication path and/or link. The transmitted process control information may include the values of variables corresponding to a measured output from each field device. The outputs 116 also include a status of block mode elements of configuration blocks specified within the field devices 112.

The process control system 104 also includes an I/O card 118 (e.g., one or more I/O cards) to receive data from the field devices 112 and convert the data into communications capable of being processed by the example controller 108. Likewise, the I/O card 118 may convert data or communications from the controller 108 into a data format capable of being processed by the corresponding field devices 112.

The example controller 108 of FIG. 1 may be language neutral and operate one or more control routines (e.g., process control algorithms, functions, and/or instructions) to manage the field devices 112 within the process control system 104. The control routines calculate runtime data based on the outputs 116 from the field devices 112 for applications including, for example, monitoring applications, alarm management applications, process trending and/or history applications, diagnostic applications, batch processing and/or campaign management applications, statistical applications, streaming video applications, advanced control applications, safety instrumented applications, event applications, etc. The applications also include status and/or mode applications. The controller 108 forwards runtime data to the workstation 106 and/or any other process control database and/or processor (not shown) at periodic intervals and/or upon processing or generating the runtime data. The runtime data transmitted by the controller 108 may include process control values, data values, alarm information, text, block mode element status information, diagnostic information, error messages, parameters, events, and/or device identifiers.

Additionally, the control routines may generate runtime data (e.g., process control information) that may be utilized by the workstation 106 and/or other workstations within the process control system 104. In some instances, the runtime data may be stored within the controller 108 and/or a runtime data cache within the process control system 104. In other instances, the runtime data may be transmitted by the controller 108 to a database that links, writes and/or stores the runtime data to control parameters.

To store definitions of configuration blocks for the field devices 112, the example process control environment 100 includes a device descriptor database 120. The example device descriptor database 120 is communicatively coupled to the workstation 106 via the LAN 110. In other examples, the device descriptor database 120 may be included within the workstation 106 and/or included within other workstations (not shown) associated with the process control environment 100. In yet other examples, each of the workstations within the process control environment 100 may include a local version of the device descriptor database 120. These local versions may be updated with device definition files periodically. In this manner, the interface processor 102 may access the locally stored device descriptor database 120 without using the LAN 110 (e.g., when the workstation 106 is offline).

The example interface processor 102 accesses the device descriptor database 120 to determine how statuses of block mode elements are combined to calculate a mode of a configuration block. In examples where the field devices 112 include components, the interface processor 102 accesses the device descriptor database 120 to determine how modes of configuration blocks are combined to calculate a mode of a component of the field devices 112. Further, the interface processor 102 accesses the device descriptor database 120 to determine how modes of components are combined to calculate a mode of a field device within the field devices 112. Alternatively, the interface processor 102 accesses the device descriptor database 120 to determine how modes of configuration blocks are combined to calculate a mode of a field device. Additionally, the interface processor 102 may access the device descriptor database 120 for a file that defines modes of the process control system 104. The interface processor 102 uses the system-level file to determine how the modes of the field devices 112 are combined to calculate a mode and/or a status of the process control system 104.

For each type of configuration block, the example device descriptor database 120 may include, for example, a device definition file (e.g., a device description file) that defines possible modes of the configuration block based on possible combinations of statuses of block mode elements. When the interface processor 102 is to display a mode of a configuration block, the interface processor 102 parses runtime data from the controller 108 for process control status information that includes statuses of block mode elements associated with the configuration block. The interface processor 102 then accesses the device descriptor database 120 to determine a mode of the configuration block based on the received statuses of the block mode elements. The interface processor 102 may then display the mode of the configuration block within applications displayed by the user interface 107.

Upon calculating modes of configuration blocks, the interface processor 102 may calculate modes of components of the field devices 112 based on definitions of the components within the device descriptor database 120. For example, a device definition file may indicate that a temperature sensor component TS01 has a functional configuration block with an identifier of FC05 and a transducer configuration block within an identifier of TC72. The interface processor 102 uses the calculated mode of the FC05 functional configuration block and the TC72 transducer configuration block to determine the mode of the TS01 component based on a definition of the mode within a device definition file. The interface processor 102 may then display the mode of the TS01 component within the user interface 107.

The device definition files that specify modes of configuration blocks may be determined by manufacturers of the field devices 112. The definitions may be based on industry standards (e.g., the Foundation Fieldbus™ protocol) and/or standards defined for the process control environment 100. Generally, the device definition files are stored in a read-only format within the device descriptor database 120. In some examples, process control personnel may edit and/or modify device definition files based on changes to the field devices 112.

In other examples, the device descriptor database 120 may include a routine and/or algorithm for calculating a mode of a configuration block based on aggregating and/or combining block mode elements. In this manner, the device descriptor database 120 may utilize device definition files within a routine to determine a mode based on any number and/or types of block mode elements. The interface processor 102 may also determine which statuses of block mode elements are to be combined based on runtime data from the controller 108. For example, one of the field devices 112 may transmit status process control information in a message that identifies the field device, a component of the device, a configuration block of the component and statuses of block mode elements within the configuration block. The interface processor 102 can use the identification information within the message to identify which block mode elements are associated with which configuration block and aggregate and/or combine the corresponding statuses to determine the mode of the configuration block. In a similar manner, the interface processor 102 can combine modes of configuration blocks to determine a mode of a component and modes of components to determine a mode of a field device.

A routine to calculate a mode of a configuration block may include aggregating and/or combining block mode element statuses. Because many block mode elements have industry standardized definitions, a routine can be defined based on those standardized definitions. For example, if all of the statuses are automatic and/or normal, the routine may be defined to return a normal operating mode. In another example, if the statuses of some element blocks are out-of-service and a status of a normal element block is automatic and/or normal, the routine may be defined to return a configuration and/or calibration operating mode.

The example interface processor 102 may calculate modes for all configuration blocks, components, and/or the field devices 112 based on received runtime data from the controller 108. In other examples, the interface processor 102 may calculate modes only for configuration blocks, components, and/or the field devices 112 displayed within the user interface 107. For example, the interface processor 102 may determine that the user interface 107 is displaying a mode of a field device. The example interface processor 102 calculates modes for configuration blocks, components, and the field device but may only display the mode of the field device. Further, as the field devices 112 change, the interface processor 102 updates the modes of the configuration blocks, components, and/or the field devices 112.

In addition to displaying modes of configuration blocks, components, and/or the field devices 112, the example interface processor 102 enables a user of the workstation 106 to change an operating condition of a field device by selecting a displayed mode. For example, the user interface 107 may display a graphic with a mode that indicates that a FIC_101 field device is in service. The mode may be displayed as a graphical icon that is colored green and is labeled with the text 'In Service.' This mode may be based on a TC02 transducer configuration block having an in-service mode and a FC87 functional configuration block having an in-service mode. A user may select the graphical icon and select an out-of-service mode, thereby causing the interface processor 102 to change the appearance of the graphical icon to red with a label 'Out of Service.' The interface processor 102 also accesses the device descriptor database 120 for a device definition file for the FIC_101 field device. The device definition file may indicate that the FIC_101 field device can be placed in an out-of-service mode by placing target block mode elements of the TC02 transducer configuration block and the FC87 functional configuration block in an out-of-service status. As a result, the interface processor 102 changes the status of the target block mode element to out-of-service by sending an instruction to the FIC_101 field device via the controller 108. The FIC_101 field device receives the instruction and changes the statuses of the target blocks elements of the TC02 transducer configuration block and the FC87 functional configuration block to out-of-service. In this manner, a user is able to remove the TIC_101 field device from service by selecting a graphical icon. In many known systems, the user would have to identify which of the block mode elements are required to be changed and send individual instructions to each of the identified block mode elements.

By enabling the user interface 107 to display a mode of the field devices 112, components of the field devices 112, and/or configuration blocks, the example interface processor 102 reduces a number of displayed graphics. By reducing the number of graphics, thereby simplifying rendering of the user interface 107, the example interface processor 102 enables the user interface 107 to be displayed within different types of web-based applications and/or applications operated by wireless devices. For example, with fewer graphics on the user interface 107, a user may view modes of the field devices on a relatively smaller screen of a wireless device. Additionally or alternatively, a user may access the process control environment 100 remotely via the Internet and view the modes of the field devices in a Flash and/or Electronic Device Descriptor Language (EDDL) file.

The example interface processor 102 of the illustrated example also manages the display of graphics based on process control information received from the controller 108. Graphics may include charts, gauges, graphs, menus, tabs, data fields, indicators, tables, and/or any other graphical representation of process control information. The process control information may include statuses of block mode elements of configuration blocks, parameter information from the field devices 112 and/or any other information that indicates which objects of the field devices 112 are activated and/or available (e.g., conditional device parameters). For example, normal block mode elements may have a status that indicates if the corresponding configuration block is available and/or activated. The interface processor 102 may identify the status in normal block mode elements to determine which components of the corresponding configuration blocks within a field device are available and/or activated. The interface processor 102 may then remove and/or hide graphics within an application displayed via the user interface 107 that are associated with the deactivated and/or unavailable components. In addition to a mode of the component, the interface processor 102 may also remove and/or hide graphics in other types of applications that display functional process control information (e.g., measured device values from the outputs 116 of the field devices 112), alarm applications, event applications, etc.

The example interface processor 102 may also receive instructions from process control personnel that indicate which objects on the field devices 112 are activated and/or available. The interface processor 102 may also use runtime data received from the controller 108 and a device definition file within the device descriptor database 120 to determine that no status information is available for some block mode elements of a component and/or configuration block. The interface processor 102 may use the lack of status information to infer that the configuration blocks and/or components are unavailable and/or deactivated. The example interface processor 102 may also receive device parameters (e.g., conditional device parameters) from the field devices 112 that indicate which of the objects are activated and/or available. In some examples, unavailable and/or deactivated components may be unlicensed for use in the process control environment 100 and/or deactivated because they are not needed within the process control system 104.

By removing graphics associated with unused components and/or configuration blocks, the example interface processor 102 makes applications displayed via the user interface 107 relatively more readable to a user. In this manner, a user is presented with only relevant graphics that correspond to activated components. Further, by removing and/or hiding graphics corresponding to unused components and/or configuration blocks, the example interface processor 102 eliminates a possibility that a user believes a graphic shows a component that is broken instead of an unlicensed component. In other words, a user may spend time trying to troubleshoot a component that is intentionally deactivated.

Figure 2:
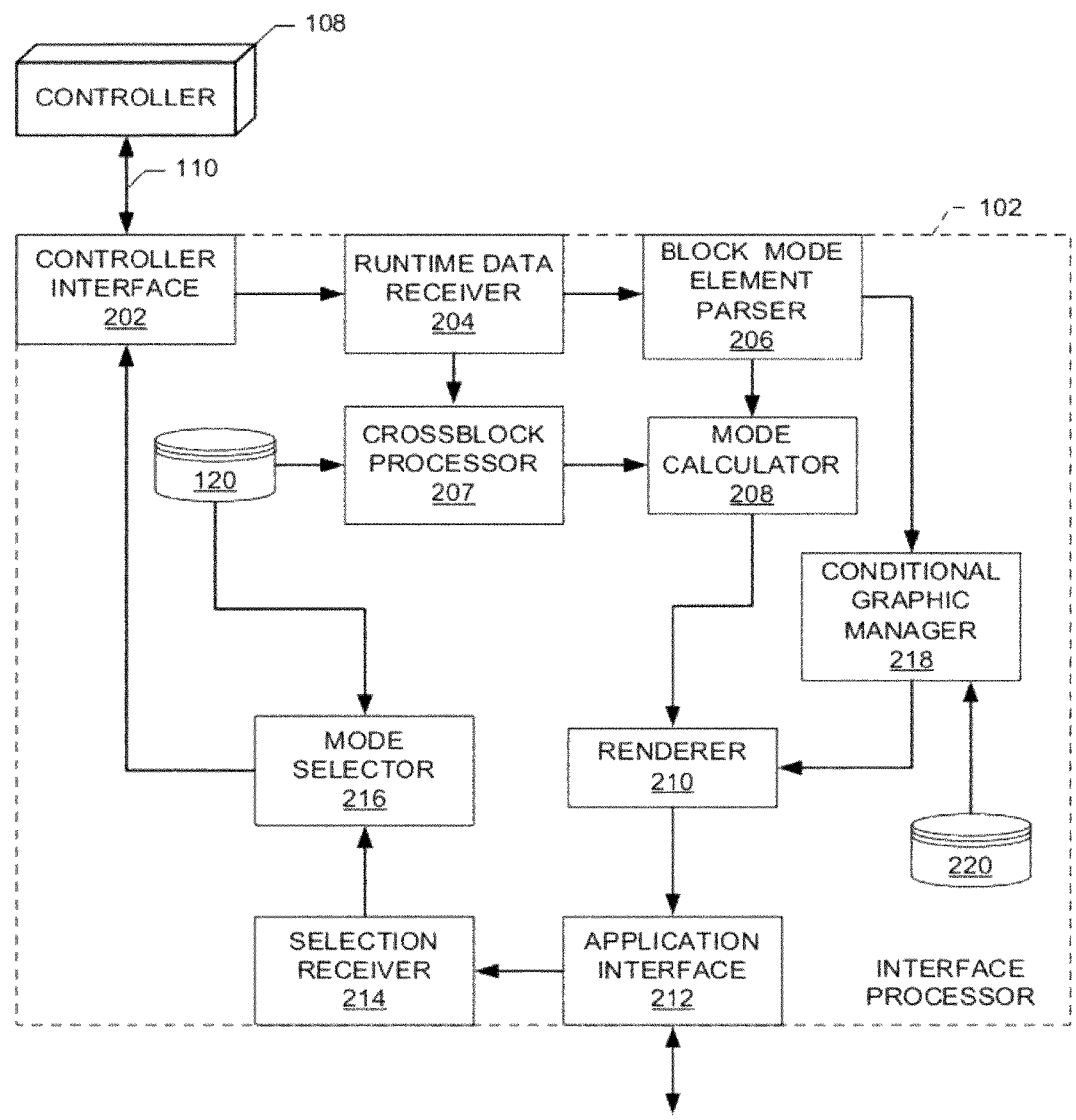
FIG. 2 shows a functional block diagram of the example interface processor of FIG. 1.

FIG. 2 shows a functional block diagram of the example interface processor 102 of FIG. 1. The example interface processor 102 is shown including the device descriptor database 120. In other example implementations, the device descriptor database 120 may be external and communicatively coupled to the interface processor 102. To receive runtime data from the controller 108 of FIG. 1, the example interface processor 102 includes a controller interface 202. The example controller interface 202 is communicatively coupled to the controller 108 via the LAN 110.

The example controller interface 202 of the illustrated example 202 receives runtime data generated by the controller 108 and forwards the runtime data for processing. In some examples, the controller interface 202 may periodically poll the controller 108 for runtime data. In other examples, the controller interface 202 may access a database that stores runtime data. The runtime data received by the controller interface 202 includes process control status information, conditional parameters, and/or any other information that the interface processor 102 may use to generate process control-related graphics.

The example controller interface 202 also transmits messages from the interface processor 102 to the controller 108, which then converts the messages into a format compatible with the field devices 112. The messages may include instructions and/or commands to change one or more statuses of block mode elements, thereby placing the field devices 112 into a specified operating condition. In some examples, the controller interface 202 may queue the messages until the controller 108 is available to receive the messages.

To queue and/or distribute the received runtime data, the example interface processor 102 includes a runtime data receiver 204. The example runtime data receiver 204 examines received runtime data for process control status information and/or conditional parameters. The process control status information is transmitted by the runtime data receiver 204 to a block mode element parser 206. Additionally, the runtime data receiver 204 determines field device identifiers, component identifiers and/or configuration block identifiers within the runtime data. The runtime data receiver 204 may then transmit a message to a crossblock processor 207 with the determined identifiers. Additionally, the runtime data receiver 204 may forward other types of runtime data to applications to display corresponding graphics.

The example runtime data receiver 204 may also queue messages for the crossblock processor 207 until the crossblock processor 207 is available. Further, the example runtime data receiver 204 may queue process control status information until the block mode element parser 206 is available to process the status information. In other examples, the runtime data receiver 204 forwards all received runtime data to the appropriate functional block.

To parse and/or filter the process control status information, the example interface processor 102 includes the block mode element parser 206. The example block mode element parser 206 examines process control status information forwarded by the runtime data receiver 204 for identifiers of the field devices 112, components of the field devices 112, configuration blocks of the components, and/or block mode elements of the configuration blocks. In examples where a device definition file exists, the block mode element parser 206 locates statuses of block mode elements and forwards these statuses to a mode calculator 208. The block mode element parser 206 may locate the statuses of the block mode elements within runtime data based on identifiers of the block mode elements. Further, the example block mode element parser 206 may request any additional statuses of block mode elements that may be processed and/or stored within the workstation 106 and/or any other processor of the process control system 104. In this manner, the block mode element parser 206 accumulates status information that is not generated and/or processed by the controller 108 but is needed to calculate a mode of a configuration block, a component, and/or a field device.

The block mode element parser 206 of FIG. 2 determines relationships between block mode elements, configuration blocks, components, and/or field devices in examples when a device definition file is unavailable and/or in examples when the interface processor 102 calculates a mode based on a routine and/or algorithm. To determine these relationships, the block mode element parser 206 may use locations of the identifiers with a message that includes runtime data. For example, status information for a field device may be transmitted as a series of messages, with a first message for a first component and a separate second message for a second component. Each of the messages may be internally partitioned based on status information regarding configuration blocks that are included with the component. Further, statuses of block mode elements may be ordered within the message to coincide with an associated configuration block. The block mode element parser 206 may use these relationships within the message to determine the relationship between the block mode elements, configuration blocks, components, and/or field devices and transmit the relationship information to the mode calculator 208.

The example crossblock processor 207 of FIG. 2 uses a message with identifier(s) from the runtime data receiver 204 to access the device descriptor database 120 for a device definition file. The device definition file may correspond to the process control system 104, the field devices 112, a field device within the field devices 112, a component of a field device, and/or a configuration block of a component and/or a field device. A device definition file may also indicate which mode is to be displayed as a graphic. For example, a device definition file for a field device may indicate that graphics are to be displayed showing a mode of the field device and modes of components of the field device.

Upon receiving the identifier(s), the example crossblock processor 207 accesses the device descriptor database 120 to determine which of the identifier(s) has a corresponding device definition file. For example, identifiers of configuration blocks and components may each correspond to a device definition file or, alternatively, a single device definition file may exist for a field device. In examples where the crossblock processor 207 locates multiple device definition files for a set of identifiers, the crossblock processor 207 aggregates and/or combines the files and transmits the files to the mode calculator 208. In other examples where there is only a single device definition file for one or more identifiers, the crossblock processor 207 sends the file to the mode calculator 208.

The example mode calculator 208 of the illustrated example uses statuses of block mode elements to determine modes of configuration blocks, components, field devices and/or the process control system 104. The mode calculator 208 may also use relationship information and/or device definition file(s) to determine which of the modes are to be displayed as graphics. Upon determining mode(s), the example mode calculator 208 assigns the mode to the graphic(s) to be displayed. The example mode calculator 208 then transmits the mode(s) and the corresponding graphic assignment to a renderer 210 for display within one or more applications via the user interface 107 of FIG. 1.

In examples where modes are calculated based on an algorithm and/or routine, the mode calculator 208 uses relationship information identified by the block mode element parser 206 to determine which statuses of block mode elements are to be combined and/or aggregated. The mode calculator 208 may then use instructions with an algorithm and/or routine to determine a mode. For example, the mode calculator 208 may receive a status of three block mode elements (e.g., a target, an actual, and a normal block mode element) that are used to determine a mode of a configuration block. The instructions may indicate that if the status of the target block mode element does not match the status of the actual block mode element, the configuration block is in an error mode. In another example, the instructions may indicate that if the target, actual, and normal block mode elements have an out-of-service status, then the configuration block is in a deactivated, unused, and/or unlicensed mode. Alternatively, the instructions may indicate that the configuration block is in a configuration mode if the normal block mode element has an automatic status and the actual and target block mode elements have an out-of-service status. In another example, the mode calculator 208 may include instructions that specify that if all configuration blocks included within a field device and/or component are in a normal operating mode, then the field device and/or the component has a normal operating mode.

Additionally, the example mode calculator 208 uses device definition files to calculate modes. The mode calculator 208 uses a device definition file to determine which statuses of block mode elements are grouped together as a mode of a configuration block. The example mode calculator 208 may also use a device definition file to determine which modes of configuration blocks are grouped together to identify a mode of a component and/or a field device. Further, the mode calculator 208 uses a device definition file to determine which modes of components are grouped together to identify a mode of a field device. Additionally, the mode calculator 208 may use a device definition file to determine which modes of field devices are grouped together to identify a mode of the process control system 104. In some examples, a device definition file may indicate that a mode of a field device is based on statuses of block mode elements. In these examples, the mode calculator 208 groups the statuses of block mode elements to determine a mode for the corresponding field device.

To calculate a mode based on statuses of block mode elements, the example mode calculator 208 of FIG. 2 may use a table and/or information (e.g., predetermined modes) within a device definition file that specifies a mode based on a combination of block mode element statuses. An example of a table is shown and described below in conjunction with FIG. 4. In some examples, the table and/or information may be generic for all types of configuration blocks. Alternatively, each type of configuration block for each component and/or field device may have a table and/or information. The example mode calculator 208 compares the statuses for the block mode elements associated with the configuration block to identify a mode. The mode calculator 208 may determine modes for all configuration blocks associated with a component, and then determine a mode of the component. The mode of a component may be defined based on modes of associated configuration blocks. Alternatively, the mode of a component may be based on statuses of block mode elements within configuration blocks associated with the components.

The example mode calculator 208 continues calculating modes until all specified modes are determined. In some examples, the mode calculator 208 may calculate modes for configuration blocks, components, and/or field devices associated with identifiers received by the interface processor 102 from the controller 108. In other examples, the block mode element parser 206 and/or the mode calculator 208 may determine which graphics are displayed within the user interface 107. In these other examples, the mode calculator 208 determines modes for configuration blocks, components, and/or field devices associated with the displayed graphics. In yet other examples, the mode calculator 208 determines modes for configuration blocks, components, and/or field devices based on instructions from process control personnel.

To display modes, the example interface processor 102 includes the renderer 210. The example renderer 210 receives modes from the mode calculator 208. Each mode includes an identifier indicating a configuration block, component, and/or field device that the mode represents. The renderer 210 may also receive graphic information indicating which of the modes are to be displayed within which graphics. To display a mode as a graphic, the renderer 210 uses an identifier associated with the mode to select a graphic template. For example, the renderer 210 may select a first type of graphic for configuration blocks, a second type of graphic for components, and a third type of graphic for field devices. In other examples, the renderer 210 may select a graphic based on a type of a mode. In these examples, the same type of graphic may be displayed by the renderer 210 for configuration blocks that have similar modes. Further, the renderer 210 may select a graphic based on a type of the component and/or field device. For example, a sensor component may have a mode displayed within a sensor type of graphic while a valve field device may have mode displayed within a valve type of graphic. The renderer 210 may select a graphic from a database and/or may use instructions within a device definition file that describe how a graphic is to be generated.

The example renderer 210 also uses a device definition file associated with a configuration block, component, and/or field device to select which application and/or template to display the graphic. For example, a device definition file may instruct the renderer 210 to display a mode graphic for a valve controller field device within an application that shows status and process control values. Alternatively, the renderer 210 may receive information from the block mode element parser 206 and/or the mode calculator 208 indicating which graphic is to be displayed within which application.

The example renderer 210 may also select a graphic based on a type of the mode. For example, an out-of-service mode may be displayed by the renderer 210 as a first type of graphic while a normal mode may be displayed as a second type of graphic. Upon selecting a graphic for each of the modes and determining an application to display the graphic, the renderer 210 transmits the graphic for display in an appropriate application via the user interface 107.

Additionally, the example renderer 210 may couple (e.g., link) functionality to a graphic. The functionality may include a set of instructs that execute a method to display a selectable list of possible modes of a configuration block, component, and/or field device represented by the graphic. The renderer 210 may receive a list from the mode calculator 208. In other example, the renderer 210 may determine possible modes based on a device definition file stored in the device descriptor database 120. Alternatively, process control personnel may provide the renderer 210 with list(s) of possible modes of configuration blocks, components and/or field devices. In some examples, the list may include a numerical, textual, Boolean, etc. field. In this manner, a user may enter a value and/or a desired mode instead of selecting from a list of possible modes.

To communicate with applications within a user interface (e.g., the user interface 107), the interface processor 102 of FIG. 2 includes an application interface 212. The application interface 212 forwards graphics from the renderer 210 to an appropriate application displayed by the user interface 107. The application interface 212 may select the application based on information from the renderer 210 and send an instruction from the application to display the graphic. The information may include a location on an application where a graphic is to be displayed and/or any additional formatting information.

The example application interface 212 also receives instructions from applications within the user interface 107. These instructions may instruct the interface processor 102 and/or the controller 108 to configure a configuration block, a component, and/or a field device in a specified (e.g., desired) mode. A user may select and/or enter a desired mode via a graphic generated by the renderer 210. In other examples, a user may select a desired mode and/or enter a desired mode via a field within an application displayed by the user interface 107. By enabling a user to select and/or enter a desired mode for a configuration block, a component, and/or a field device, the example interface processor 102 changes statuses of block mode elements needed to place the configuration block, component, and/or field device into the desired mode. In this manner, a user only provides the desired mode and the interface processor 102 determines which statuses of which element blocks are needed to be changed and communicates this information to the controller 108.

Upon receiving an instruction to change a mode, the application interface 212 forwards the instruction to a selection receiver 214. The example selection receiver 214 processes the instruction for a mode selector 216. Processing the instruction may include queuing the instruction until the mode selector 216 is available. Processing the instruction may include parsing the instruction into separate individual instructions if the instruction includes multiple instructions.

To determine which statuses of block mode elements should be changed based on a selected desired mode, the example mode selector 216 accesses the device descriptor database 120 for a device definition file. The mode selector 216 uses the device definition file to match the desired mode selected by a user to statuses of block mode elements. For example, the mode selector 216 may receive an instruction that a user selected a configuration block to change from an in-service mode to an out-of-service mode. The mode selector 216 identifies block mode elements that are associated with the configuration block and uses a device definition file to determine which statuses to change for each of the block mode elements to cause the configuration block to operate in the desired mode. In another example, a user may select to change a mode of a field device from a normal operation mode to a calibration mode. The mode selector 216 accesses a device definition file associated with the field device and determines modes of components and/or configuration blocks that need to be changed to cause the field device to operate in the calibration mode. The mode selector 216 may then determine which statuses of block mode elements are to be changed to cause the configuration blocks and/or components to operate in a mode that causes the field device to operate in the calibration mode. Alternatively, the mode selector 216 may use the device definition file to identify which statuses of block mode elements to change to cause the field device to operate in the calibration mode.

Upon determining which block mode element statuses to change, the example mode selector 216 transmits a message to the controller 108 via the controller interface 202. The message identifies the block mode elements within the field device and identifies a status for the block mode elements. Upon receiving the message, the controller 108 generates an instruction to the field device to change the statuses of the specified block mode elements to the specified statuses. Changing the statuses of the block mode elements causes the field device, components of the field device, and/or configuration blocks to operate in the specified mode.

To determine which graphics to display based on available and/or activated components, configuration blocks, and/or field devices, the example interface processor 102 of the illustrated example includes a conditional graphic manager 218. The example conditional graphic manager 218 receives runtime data from the controller 108 via the controller interface 202 and the runtime data receiver 204. In some examples, the block mode element parser 206 may parse the runtime data for condition device parameters. In these examples, the conditional graphic manager 218 uses the conditional parameters (e.g., conditional device parameters) to identify which components, configuration blocks, and/or field devices are activated and/or available. For example, some field devices may have a data block that defines which features, functions, components, and/or configuration blocks are licensed and/or activated. These field devices may transmit a periodic message and/or transmit a message upon a request from the interface processor 102 that includes values from the data block indicating which features, functions, components, and/or configuration blocks (e.g., objects) are licensed and/or activated.

In other examples, the block mode element parser 206 may forward to the conditional graphic manager 218 process control status information. In these other examples, the conditional graphic manager 218 may use the status information to determine which components, and/or configuration blocks within a field device are activated and/or available. In some other examples, the conditional graphic manager 218 may access an activation database 220 to determine which components, configuration blocks, and/or field devices are activated and/or available. The activation database 220 may be updated by process control personnel based on which features, functions, components, configuration blocks, and/or field devices are in use (e.g., licensed for use) within the process control system 104. The activation database 220, as well as the device descriptor database 220, may be implemented by Electronically Erasable Programmable Read-Only Memory (EEPROM), Random Access Memory (RAM), Read-Only Memory (ROM), and/or any other type of memory.

The example conditional graphic manager 218 determines which features, functions, components, and/or configuration blocks are activated and/or available so that only graphics associated with the activated items are displayed within corresponding applications via the user interface 107. The conditional graphic manager 218 uses the conditional device parameters and/or information from the activation database 220 to identify which items are activated and which items are deactivated. The example conditional graphic manager 218 may also use status information to determine which items are activated based on statuses of normal block mode elements and/or a lack of a status. For example, statuses for normal block mode elements of a configuration block may be out-of-service indicating the configuration block is unavailable and/or deactivated. The conditional graphic manager 218 may also determine that if configuration blocks are unavailable and/or deactivated, corresponding components may also be deactivated and/or unavailable.

The example conditional graphic manager 218 determines which features, functions, field devices, components, and/or configuration blocks are available and sends an instruction to the renderer 210 to display corresponding graphics. The instructions may include an identifier of an item that the renderer 210 can use to locate corresponding graphics that are tagged with the same identifier. In many examples, the graphics may include status information, data fields with process control values, gauges, charts, tables, and/or any other graphical representations of process control information. Further, the graphics may be displayed within multiple applications.

The example conditional graphic manager 218 also determines which features, functions, components, field devices, and/or configuration blocks are unavailable and/or deactivated. For these items, the conditional graphic manager 218 sends an instruction to the renderer 210 to remove and/or hide graphics displayed within applications that correspond to the deactivated items. Upon receiving an instruction with items to remove and/or hide, the example renderer 210 searches applications for displayed graphic(s) with corresponding tags and/or identifiers. The renderer 210 then removes the graphic(s) from the application(s). In other examples, the renderer 210 may instruct one or more applications to hide the graphic(s). In this manner, process control personnel are shown only graphics that correspond to activated, licensed, and/or available process control features, functions, components, field devices, and/or configuration blocks.

While the example interface processor 102 has been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example controller interface 202, the example runtime data receiver 204, the example block mode element parser 206, the example crossblock processor 207, the example mode calculator 208, the example renderer 210, the example application interface 212, the example selection receiver 214, the example mode selector 216, the example conditional graphic manager 218, the example activation database 220, the example device descriptor database 120 and/or, more generally, the example interface processor 102 may be implemented by hardware, software, firmware and/or any combination of hardware, software and/or firmware. Thus, for example, any of the example controller interface 202, the example runtime data receiver 204, the example block mode element parser 206, the example crossblock processor 207, the example mode calculator 208, the example renderer 210, the example application interface 212, the example selection receiver 214, the example mode selector 216, the example conditional graphic manager 218, the example activation database 220, the example device descriptor database 120, and/or more generally, the example interface processor 102 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example controller interface 202, the example runtime data receiver 204, the example block mode element parser 206, the example crossblock processor 207, the example mode calculator 208, the example renderer 210, the example application interface 212, the example selection receiver 214, the example mode selector 216, the example conditional graphic manager 218, the example activation database 220, and/or the example device descriptor database 120 are hereby expressly defined to include a computer readable medium such as a memory, DVD, CD, etc. storing the software and/or firmware. Further still, the example interface processor 102 may include one or more elements, processes and/or devices in addition to, or instead of, those illustrated in FIG. 2, and/or may include more than one of any or all of the illustrated elements, processes and devices.

Figure 3:
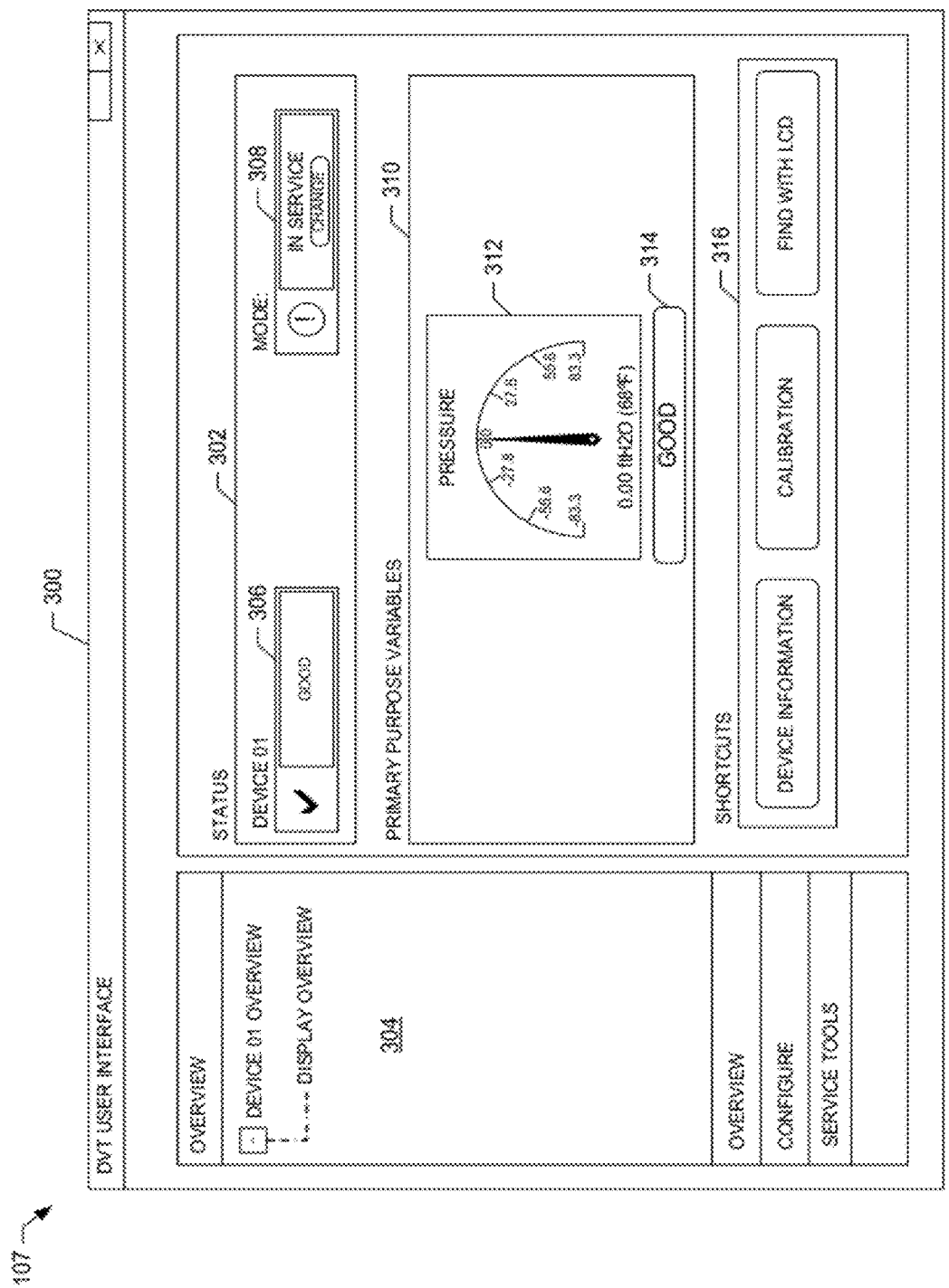
FIG. 3 shows an application displayed via the user interface of FIG. 1 that includes a graphic indicating a mode of a field device.

FIG. 3 shows a device status application 300 displayed via the user interface 107 of FIG. 1 that includes a graphic indicating a mode of a Device 01 field device. The device status application 300 includes a status panel 302 and a navigation panel 304. The example navigation panel 304 may be used by a user to locate status information regarding the Device 01 field device. The status panel 302 displays graphics indicating mode(s) and/or diagnostic information regarding the Device 01 field device. The example renderer 210 may identify the status panel 302 as a location to display graphics indicating modes of field devices, components, and/or configuration blocks. Specifically, the status panel 302 includes a diagnostic graphic 306 and a mode graphic 308. The diagnostic graphic 306 displays diagnostic errors associated with the Device 01 field device. In this example, the diagnostic graphic 306 indicates that the Device 01 field device does not have any errors (e.g., via the Good mode). In other examples, the diagnostic graphic 306 may show a Failed mode to indicate one or more errors. The diagnostic graphic 306 may also show an Advisory mode and/or a Maintenance mode.

The example mode graphic 308 shows a mode of the Device 01 field device. In this example, the mode graphic 308 indicates that the Device 01 field device is in an in-service mode. In some examples, the mode graphic 308 may be displayed in one or more colors representative of an in-service mode. The example mode graphic 308 is generated by the example interface processor 102 of FIGS. 1 and 2. In this example, the interface processor 102 identifies statuses of block mode elements associated with the Device 01 field device and calculates modes for any corresponding configuration blocks and/or components. The example interface processor 102 then calculates the in-service mode based on calculated modes of the configuration blocks and/or the components. The interface processor 102 may access a device definition file associated with the Device 01 field device to determine the modes and/or to determine that only the mode of the Device 01 field device is to be displayed at the mode graphic 308 (e.g., modes of configuration blocks and/or components are not to be displayed as graphics).

By the example mode graphic 308 displaying a mode of the Device 01 field device, a user does not have to search for graphics of statuses of block mode elements to determine the mode. Additionally, because block mode element statuses are not shown, the device status application 300 has fewer graphics to display. With fewer displayed graphics, the device status application 300 is relatively easier to view.

A user may select the Change icon within the mode graphic 308 to view a list of possible modes for the Device 01 field device. Selecting the change icon causes the interface processor 102 to execute instructions within the device definition file that toggles the possible modes of the Device 01 field device. The user may then select one of the possible modes causing the example interface processor 102 to determine which statuses of block mode elements to change to have the Device 01 field device operate in the selected mode. Alternatively, the Change icon may only enable a user to select between two different modes. Upon selecting a different mode, the interface processor 102 may change the mode graphic 308 to represent the selected mode. Alternatively, the interface processor 102 may change the mode graphic 308 to an intermediate graphic while the Device 01 field device is changed to the desired mode. Then, when the interface processor 102 determines that the Device 01 field device is operating in the desired mode, the interface processor 102 may change the mode graphic 308 to reflect the Device 01 field device is operating in the desired mode.

The example device status application 300 includes an information panel 310 that displays process control output information from the Device 01 field device. In this example, the output information is a pressure from a pressure sensor component that is displayed within a gauge graphic 312. Additionally, the information panel 310 includes an indicator graphic 314 to indicate if the pressure displayed within the gauge graphic 312 exceeds a limit and/or threshold. The device status application 300 also includes a device options panel 316 that includes functions a user may select to view additional information regarding the Device 01 field device.

Figures 4, 5:
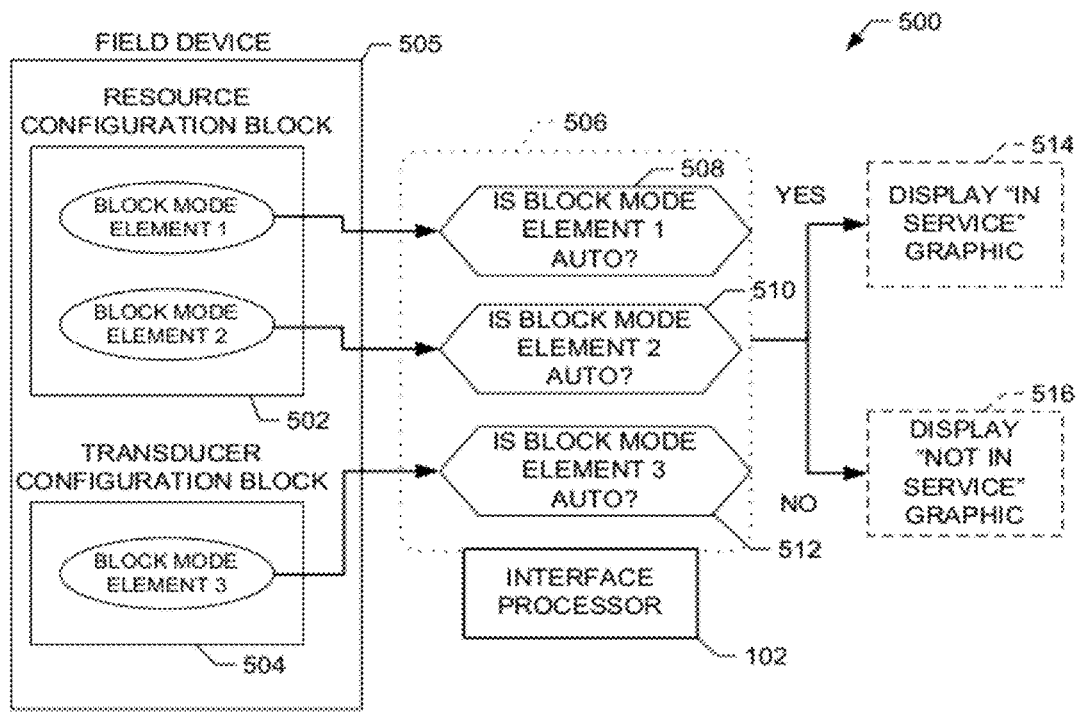
FIG. 4 shows a table of possible configuration block modes based on statuses of block mode elements.
FIG. 5 shows a functional diagram of the interface processor of FIGS. 1 and 2 calculating a mode of a configuration block and/or a field device based on statuses of block mode elements.

FIG. 4 shows an example table 400 of possible configuration block modes based on statuses of block mode elements. The example table may be a device definition file stored within the device descriptor database 120 of FIGS. 1 and/or 2. In other examples, the table 400 may be combined with other tables for other configuration blocks and/or modes of those configuration blocks to show mode(s) of components and/or a field device. In these other examples, the table 400 may be a standard table for any type of configuration block or, alternatively, may be specifically for a type of configuration block (e.g., a transducer configuration block). In yet other examples, the table 400 may be representative of instructions executed by an algorithm and/or routine within the mode calculator 208 to determine a mode of a configuration block.

The example table 400 may be specified by process control personnel, manufacturers of a device that includes a configuration block, and/or process control designers. In the example table 400 of the illustrated example, the mode of the configuration block is based on a status of a target block mode element, a status of an actual block mode element, and a status of a normal block mode element. In other examples, the table 400 may include additional or fewer block mode elements. In the example of FIG. 4, if the target block mode element, the actual block mode element, and the normal block mode element each have respective statuses of automatic, the configuration block is in a normal mode. The normal mode may indicate that the status of the target block mode element matches the status of the actual block mode element indicating that the configuration block is operating in a mode specified by a user. If these statuses match the status of the normal block mode element, the mode of the configuration block is a normal mode because the normal block mode element indicates a mode that the configuration block should be operating in under normal conditions specified by a user.

In an example, if the configuration block is available, activated, and/or licensed, a user may set the status of the normal block mode element to automatic. Thus, if the status of the actual block mode element or the target block mode element changes from automatic, the mode of the configuration block changes. Alternatively, if the configuration block is unavailable, deactivated, and/or not licensed, a user may set the status of the normal block mode element to out-of-service (OOS). The mode of the configuration block is 'not used' if the statuses of the target and the actual block mode elements are out-of-service because the configuration block is deactivated and/or unlicensed. Further, the conditional graphic manager 218 (FIG. 2) may use the out-of-service status of the normal block mode element to determine if a graphic for the mode of the configuration block should be displayed.

FIG. 5 shows a functional diagram 500 of the interface processor 102 of FIGS. 1 and 2 calculating a mode of a component and/or a field device based on statuses of block mode elements. In this example, the interface processor 102 receives statuses from Block mode element 1 and Block mode element 2 within a resource configuration block 502 and a status from Block mode element 3 within a transducer configuration block 504. The configuration blocks 502 and 504 are included within a field device 505. In other examples, the configuration blocks 502 and 504 may be included within a component within the field device 505.

Upon receiving the statuses, the mode calculator 208 within the interface processor 102 of the illustrated example accesses a device definition file and/or uses a routine to perform a calculation 506 to determine a mode of the field device 505. The calculation 506 in this example includes determining if the status of the Block mode element 1 is automatic (block 508), determining if the status of the Block mode element 2 is automatic (block 510), and determining if the status of the Block mode element 3 is automatic (block 512). In other examples, the calculation 506 may include accessing a device definition file similar to the table 400 of FIG. 4. In yet other examples, the calculation 506 may include determining a mode of the resource configuration block 502 and a mode of the transducer configuration block 504, then using the determined modes to calculate a mode of the field device 505.

In the example of FIG. 5, if the Block mode elements 1-3 each have a status of automatic, the example interface processor 102 (e.g., via the renderer 210) displays an 'In Service' graphic 514 within an application. However, if any of the Block mode elements 1-3 does not have an automatic status, then the example interface processor 102 displays a 'Not In Service' graphic 516. In other examples, the interface processor 102 may display other graphics based on the statuses of the Block mode elements 1-3.

Figure 6:
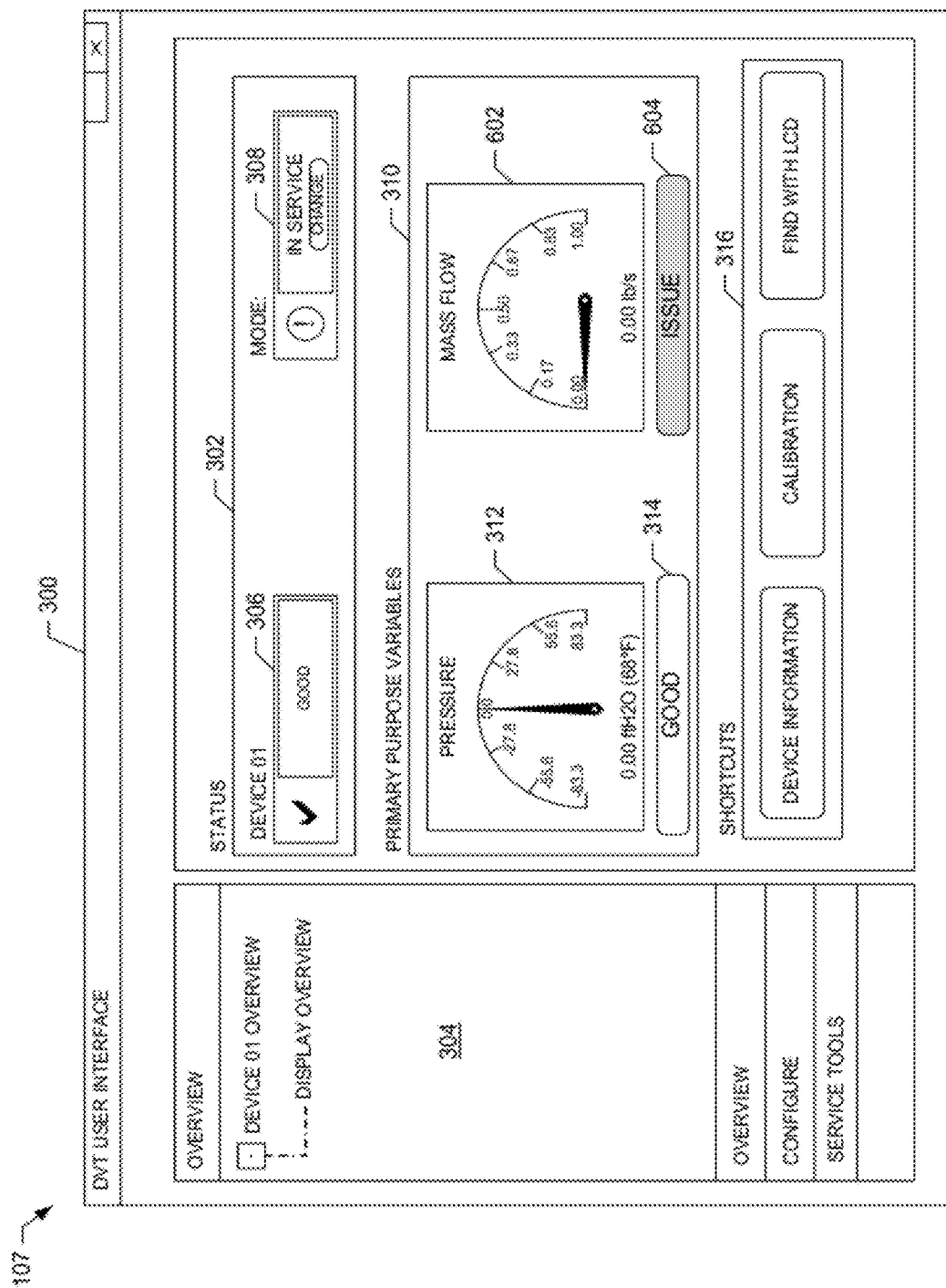
FIG. 6 shows the application of FIG. 3 including a second graphic displayed by the interface processor 102 of FIGS. 1 and 2.

FIG. 6 shows the device status application 300 including the status panel 302, the navigation panel 304, the information panel 310, and the device options panel 316 of FIG. 3. The device status application 300 of FIG. 6 also includes a second gauge graphic 602 located within the information panel 310 adjacent to the gauge graphic 312. A second indicator graphic 604 is also displayed to indicate if a mass flow of a valve displayed within the second gauge graphic 602 exceeds a limit and/or threshold.

The example interface processor 102 enables a user to view process control information generated by the pressure sensor component (e.g., via the gauge graphic 312) and the mass flow component (e.g., via the second gauge graphic 602). The pressure sensor component and the mass flow component are included within the Device 01 field device. A user may take the pressure sensor component and the mass flow component out of service concurrently by selecting the Change icon within the mode graphic 308.

The second gauge graphic 602 is displayed by the example interface processor 102 based on conditional parameter(s) received from the Device 01 field device. Alternatively, the interface processor 102 may determine from statuses of normal block mode elements associated with a mass flow component of the Device 01 field device that the mass flow component has been activated and/or licensed. In response to the conditional parameter(s) and/or the normal block mode element statuses, the interface processor 102 determines that the second gauge graphic 602 should be displayed within the device status application 300.

Figure 7:
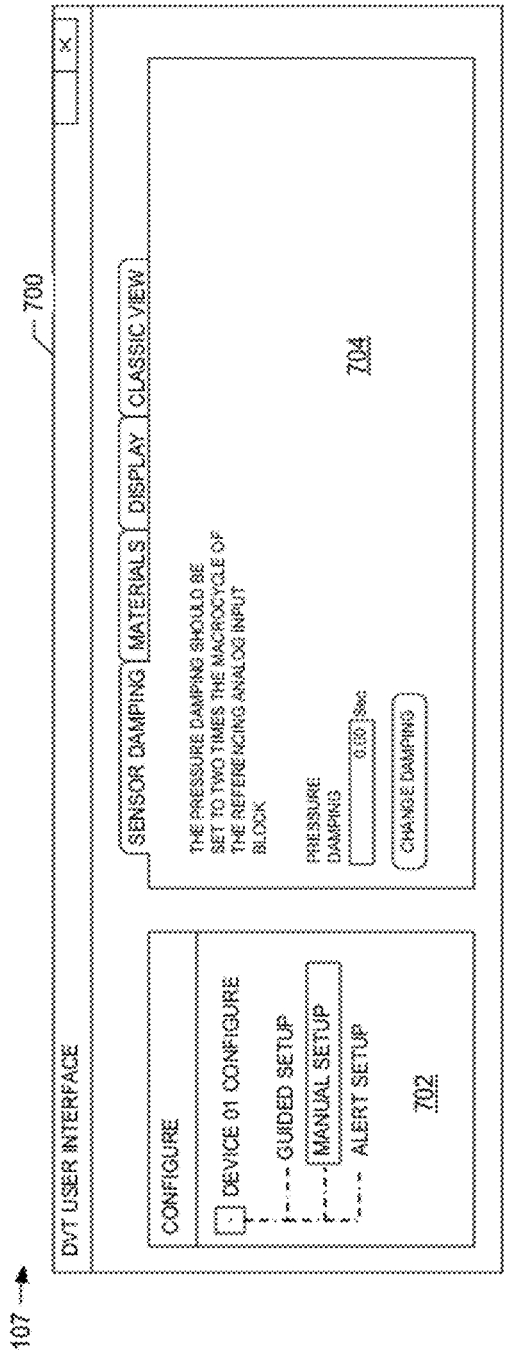
FIGS. 7 and 8 show an example of the interface processor of FIGS. 1 and 2 displaying a menu graphic based on conditional parameter(s) and/or statuses of normal block mode elements.
Figure 8:
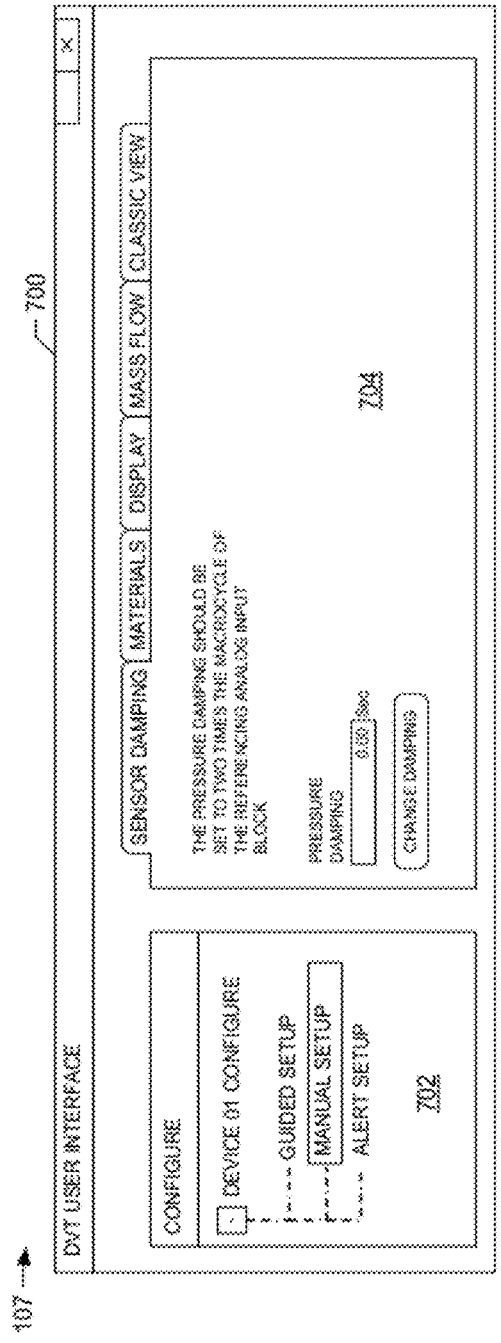

FIGS. 7 and 8 show another example of the interface processor 102 of FIGS. 1 and 2 displaying a graphic based on conditional parameter(s) and/or statuses of normal block mode elements. These figures show an application 700 displayed via the user interface 107 with a navigation panel 702 and a process control information panel 704. A user may locate the process control information panel 704 via the navigation panel 702. In this example, a user selects to view manual setup process control information for the Device 01 field device.

In FIG. 7, the interface processor 102 detects only the activation and/or licensing of the pressure sensor component. However, in FIG. 8, the interface processor 102 detects the activation and/or licensing of the mass flow component. This is depicted by the interface processor 102 displaying a tab (i.e., the Mass Flow tab and/or menu) to setup process control information for the mass flow component within the process control panel 704. Thus, the example interface processor 102 may display menu graphics that include fields for entering process control information upon determining that a corresponding component, feature, function, and/or configuration block is available, activated, and/or licensed. Further, by only showing the Mass Flow tab when the component is active, a user may only select the tab when the mass component is available to be setup. In this manner, the example interface processor 102 does not display any unused or deactivated components, features, functions, and/or configuration blocks to reduce a number of graphics displayed to a user.

Figure 9:
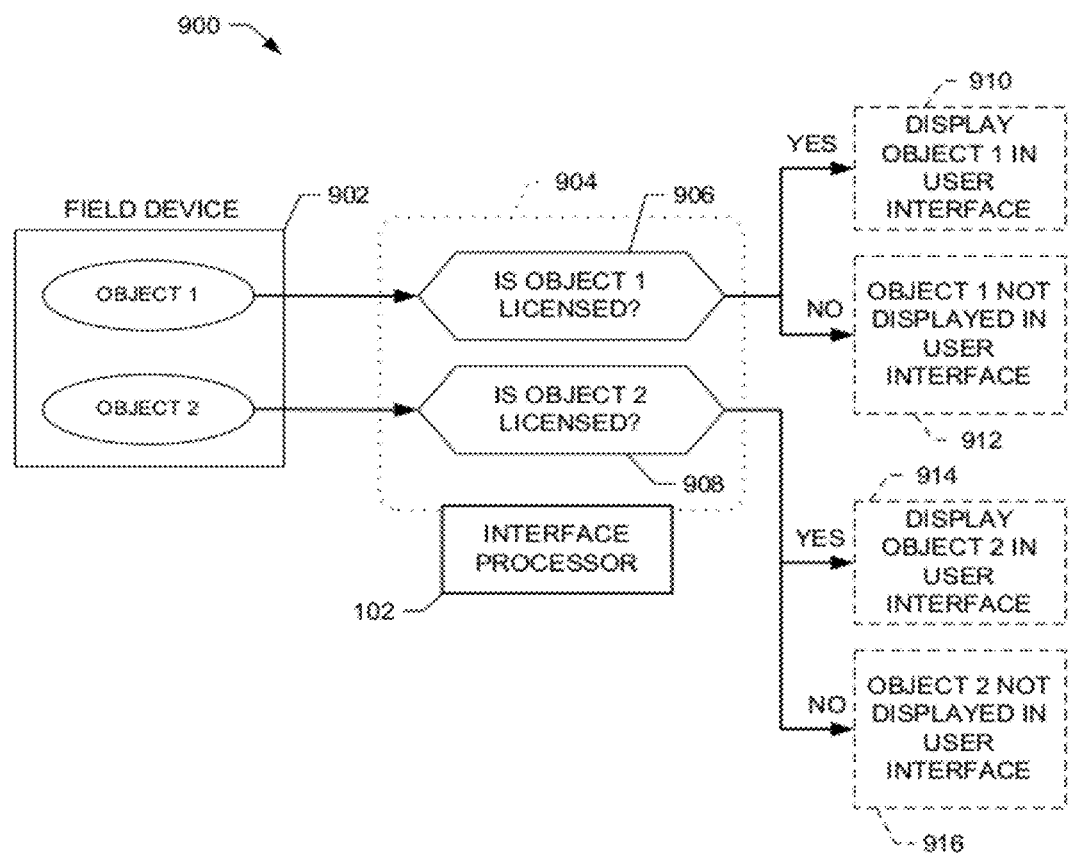
FIG. 9 shows a functional diagram of the interface processor of FIGS. 1 and 2 determining which objects within a field device are activated and/or available to display corresponding graphics.

FIG. 9 shows a functional diagram 900 of the interface processor 102 of FIGS. 1 and 2 determining which objects within a field device 902 are activated and/or available to display corresponding graphics. In this example, the interface processor 102 receives status information and/or conditional parameter(s) from the field device 902. The status information and/or conditional parameter(s) indicate that the field device 902 includes Object 1 and Object 2. In other examples, the status information and/or conditional parameter(s) (and/or any other display or functional information associated with the Object 1 and/or the Object 2) may be specified within an EDDL file stored within the interface processor 102 and/or a device communicatively coupled to the interface processor 102 (e.g., the workstation 106 of FIG. 1). The Object 1 and/or the Object 2 may refer to components, configuration blocks, block mode elements, parameters, features, and/or functions associated with the field device 902.

The example interface processor 102 (e.g., the conditional graphic manager 218) performs a determination 904 as to which graphics to display. The determination 904 includes a check to determine if the Object 1 is licensed (block 906) and a check to determine if the Object 2 is licensed (block 908). The interface processor 102 may determine if the Objects 1 and 2 are licensed based on information within the activation database 220. Alternatively, the interface processor 102 may examine statuses of normal block mode elements associated with the Objects 1 and 2. In other examples, the interface processor 102 may determine if the Objects 1 and 2 are activated and/or available. Further, the interface processor 102 may determine if additional components, configuration blocks, and/or field devices are available, activated, and/or licensed.

In the example of FIG. 9, if the Object 1 is licensed, the interface processor 102 displays graphics associated with the Object 1 within applications via the user interface 107 (block 910). However, if the Object 1 is not licensed, the interface processor 102 does not display graphics associated with the Object 1 within applications (block 912). In some examples, the interface processor 102 may instruct the applications to remove and/or hide graphics associated with the Object 1. Similarly, if the Object 2 is licensed, the interface processor 102 displays graphics associated with the Object 2 within applications via the user interface 107 (block 914). However, if the Object 2 is not licensed, the interface processor 102 does not display graphics associated with the Object 2 within applications (block 916).

Flowcharts representative of example processes 1000, 1100, and 1200 for implementing the interface processor 102 of FIGS. 1-2 are shown in FIGS. 10A, 10B, 11, and 12. In this example, the processes 1000, 1100, and 1200 may be implemented using the machine readable instructions in the form of a program for execution by a processor such as the processor P12 shown in the example processor system P10 discussed below in connection with FIG. 13. The program may be embodied in software stored on a computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowcharts illustrated in FIGS. 10A, 10B, 11, and 12, many other methods of implementing the example interface processor 102 may alternatively be used. For example, the order of execution of the blocks may be changed, and/or some of the blocks described may be changed, eliminated, or combined.

As mentioned above, the example processes of FIGS. 10A, 10B, 11, and 12 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 10A, 10B, 11, and 12 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

Figure 10A:
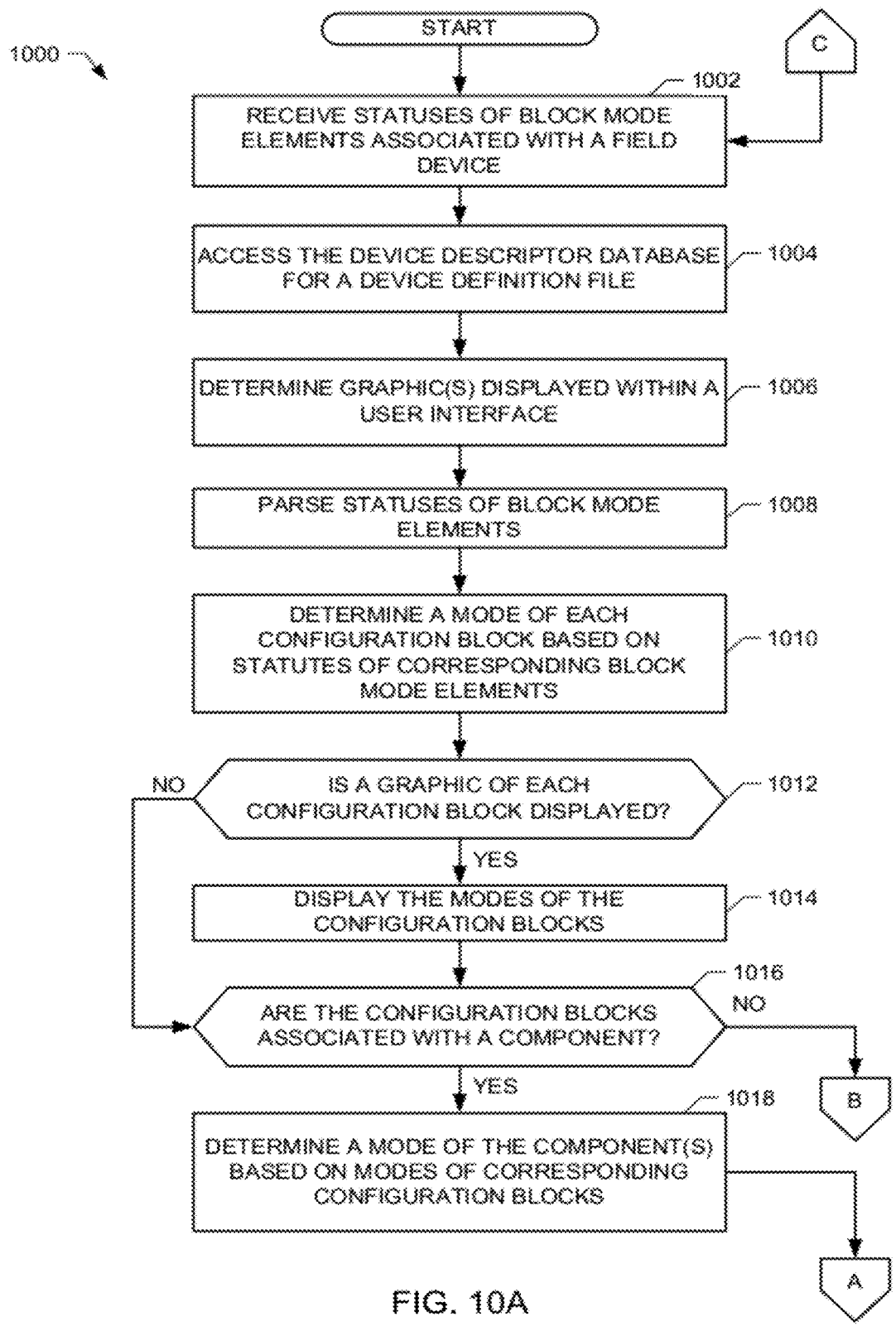
FIGS. 10A, 10B, 11, and 12 are flowcharts of example methods that may be used to implement the interface processor of FIGS. 1 and/or 2.
Figure 10B:
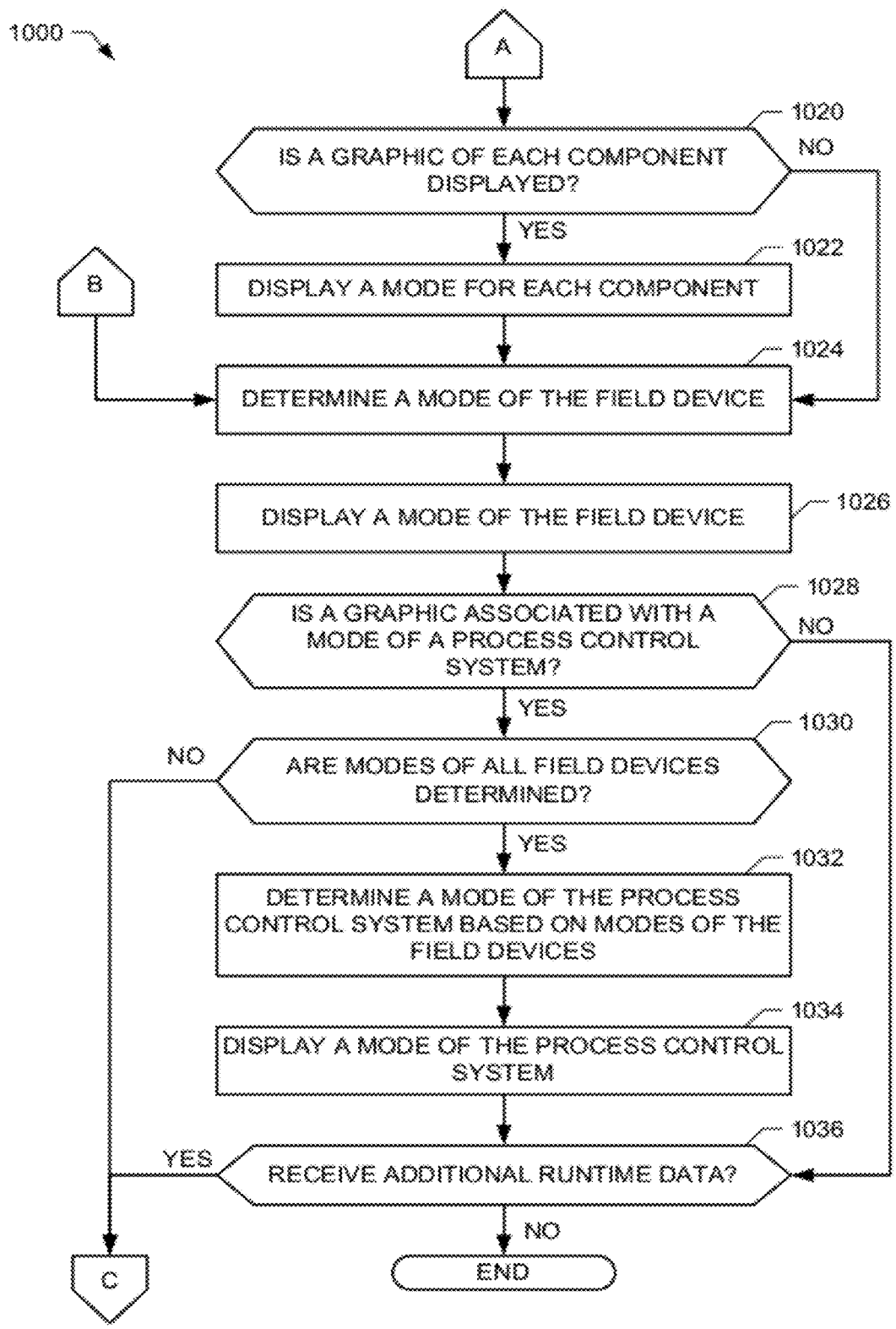

The example process 1000 of FIGS. 10A and 10B displays a mode of component(s), configuration block(s) and/or field device(s) based on received process control status information. The example process 1000 of FIG. 10A begins by receiving statuses of block mode elements associated with a field device (e.g., via the runtime data receiver 204) (block 1002). The block mode element may also correspond to a configuration block within a component associated with the field device. The example process 1000 then accesses the device descriptor database 120 for a device definition file associated with the field device (e.g., via a crossblock processor 210) (block 1004). In other examples, the process 1000 may use an algorithm and/or a routine instead of a device definition file to determine a mode of a field device, component, and/or configuration block.

The example process 1000 then determines graphic(s) displayed within application(s) via the user interface 107 (e.g., via the block mode element parser 206 and/or the mode calculator 208) (block 1006). The example process 1000 also parses statuses of block mode elements from other process control information received as runtime data (e.g., via the block mode element parser 206) (block 1008). The example process 1000 may also locate identifiers associated with the block mode elements, configuration blocks, and/or the field device. The example process 1000 next determines a mode of each identified configuration block based on statuses of corresponding block mode elements (e.g., via the mode calculator 208) (block 1010). To determine the mode, the example process 1000 uses the device definition file or, alternatively, uses instructions within an algorithm and/or routine.

The example process 1000 then determines if the determined mode for each of the configuration blocks is to be displayed as a graphic (e.g., via the mode calculator 208) (block 1012). For each of the modes of the configuration blocks that are to be displayed as graphics, the example process 1000 displays the modes as graphics within one or more corresponding applications via the user interface 107 (e.g., via the renderer 210) (block 1014). The example process 1000 then determines if the configuration blocks are associated with a component (e.g., via the mode calculator 208) (block 1016). Additionally, for each of the modes of the configuration blocks that are to be displayed as graphics (block 1012), the example process 1000 determines if the configuration blocks are associated with a component (block 1016). In other examples, the example process may calculate modes of components, and/or a field device upon determining modes of configuration blocks.

If the configuration blocks are associated with at least one component, the example process 1000 determines a mode of the component(s) based on modes of the corresponding configuration blocks (e.g., via the mode calculator 218) (block 1018). In other examples, the process 1000 may determine modes of the component(s) based on statuses of corresponding block mode elements. The example of process 1000 of FIG. 10B then determines if a graphic of the mode of each of the component(s) is to be displayed (e.g., via the mode calculator 218) (block 1020). For each of the components that is to be displayed as a graphic, the example process 1000 displays a mode for each of the components as a graphic within an application (e.g., via the renderer 210)

(block 1022). The example process 1000 then determines a mode of the field device (block 1024). Additionally, if the example process of FIG. 10A determines that there are no configuration blocks associated with at least one component (block 1016), or if modes of the component(s) are not to be displayed as graphic(s) (block 1020), the example process 1000 of FIG. 10B determines a mode of the field device (block 1024).

The example process 1000 of the illustrated example continues by displaying a mode of the field device as a graphic within an application (e.g., via the renderer 210) (block 1026). In some examples, the process 1000 may determine if a graphic is to be displayed for a mode of the field device. The example process 1000 then determines if there is a mode graphic associated with the process control system 104 (e.g., via the mode calculator 208) (block 1028). If there is a mode graphic for the process control system, the example process 1000 determines if modes are calculated for all field devices within the process control system (e.g., via the mode calculator 208) (block 1030).

If modes of the field devices are determined, the example process 1000 determines a mode of the process control system 104 based on modes of the field devices (e.g., via the mode calculator 208) (block 1032). Alternatively, the example process 1000 may determine a mode of the process control system 104 based on statuses of block mode elements. The example process 1000 then displays the determined mode of the process control system 104 in an application via the user interface 107 (e.g., via the renderer 210) (block 1034).

The example process 1000 next determines if any additional runtime data has been received (e.g., via the runtime data receiver 204) (block 1036). In some examples, the process 1000 may concurrently process runtime data to calculate modes while the process 1000 displays other modes as graphics. If a graphic is not associated with a mode of the process control system 104 (block 1028), the example process 1000 also determines if additional runtime data has been received (block 1036). Further, if a mode of at least one field device has to be calculated (block 1030), the example process 1000 determines if additional runtime data has been received that includes status information to calculate a mode of the field device (block 1036). If additional runtime data has been received, the example process 1000 of FIG. 10A receives status information within the runtime data (block 1002). However, if no additional runtime data has been received, the example process 1000 terminates.

Figure 11:
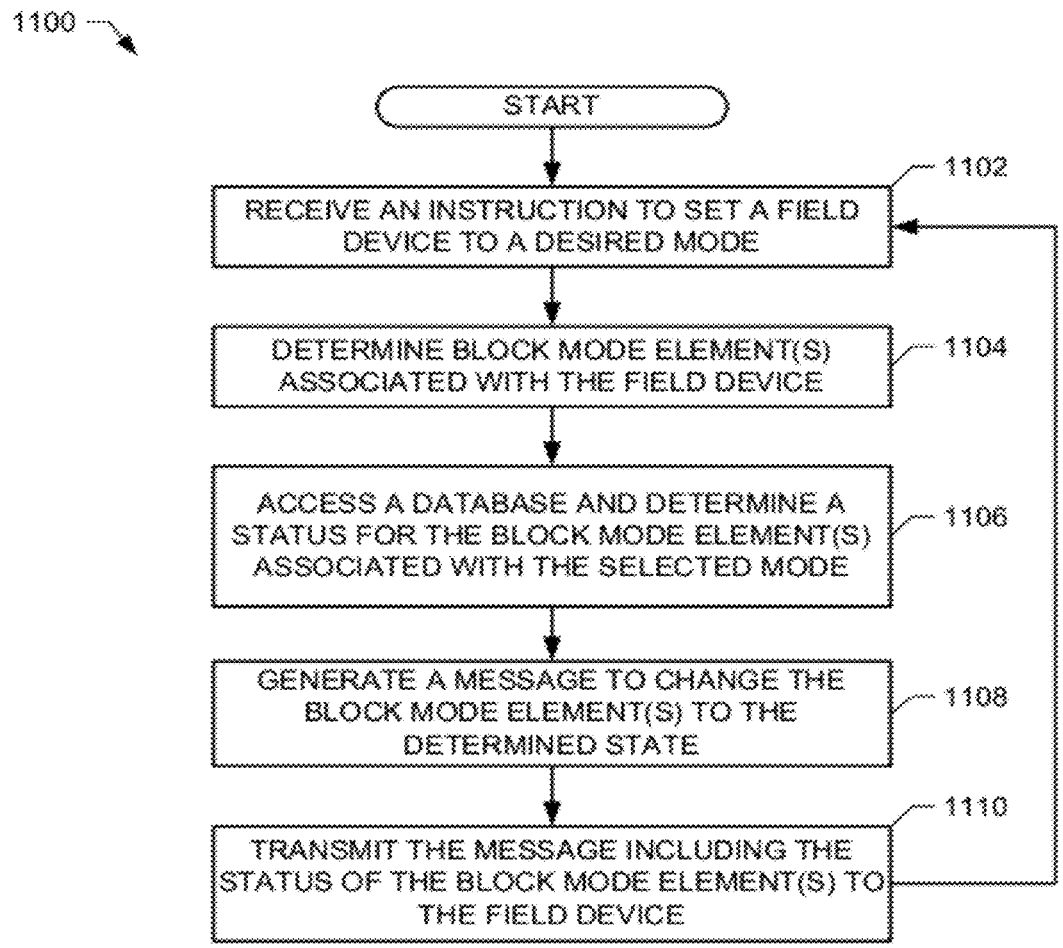

The example process 1100 of FIG. 11 sets statuses of block mode elements based on a selected mode of a field device. The example process 1100 begins by receiving an instruction to configure a field device to a desired mode (e.g., via the selection receiver 214) (block 1102). In other examples, the process 1100 may receive an instruction to set a component and/or a configuration block to a desired mode. The example process 1100 may receive the instruction by a user selecting a mode via a graphic displayed in an application. The example process 1100 then determines block mode element(s) associated with the field device (e.g., via the mode selector 216) (block 1104).

The example process 1100 continues by determining a status for the block mode element(s) based on the selected mode of the field device (e.g., via the mode selector 216) (block 1106). The example process 1100 may determine the block mode element(s) and/or operating status(es) of the block mode element(s) based on a device definition file associated with the field device. The example process 1100 then generates a message for the field device to change the block mode element(s) to the determined status(es) (e.g., via the mode selector 216) (block 1108). The example process 1100 then transmits the message to the field device via the controller 108 (e.g., via the controller interface 202) (block 1110). The example process 1100 then returns to receiving an instruction to set another field device to a desired mode (block 1102). In other examples, the example process 1100 may terminate after transmitting the message.

Figure 12:
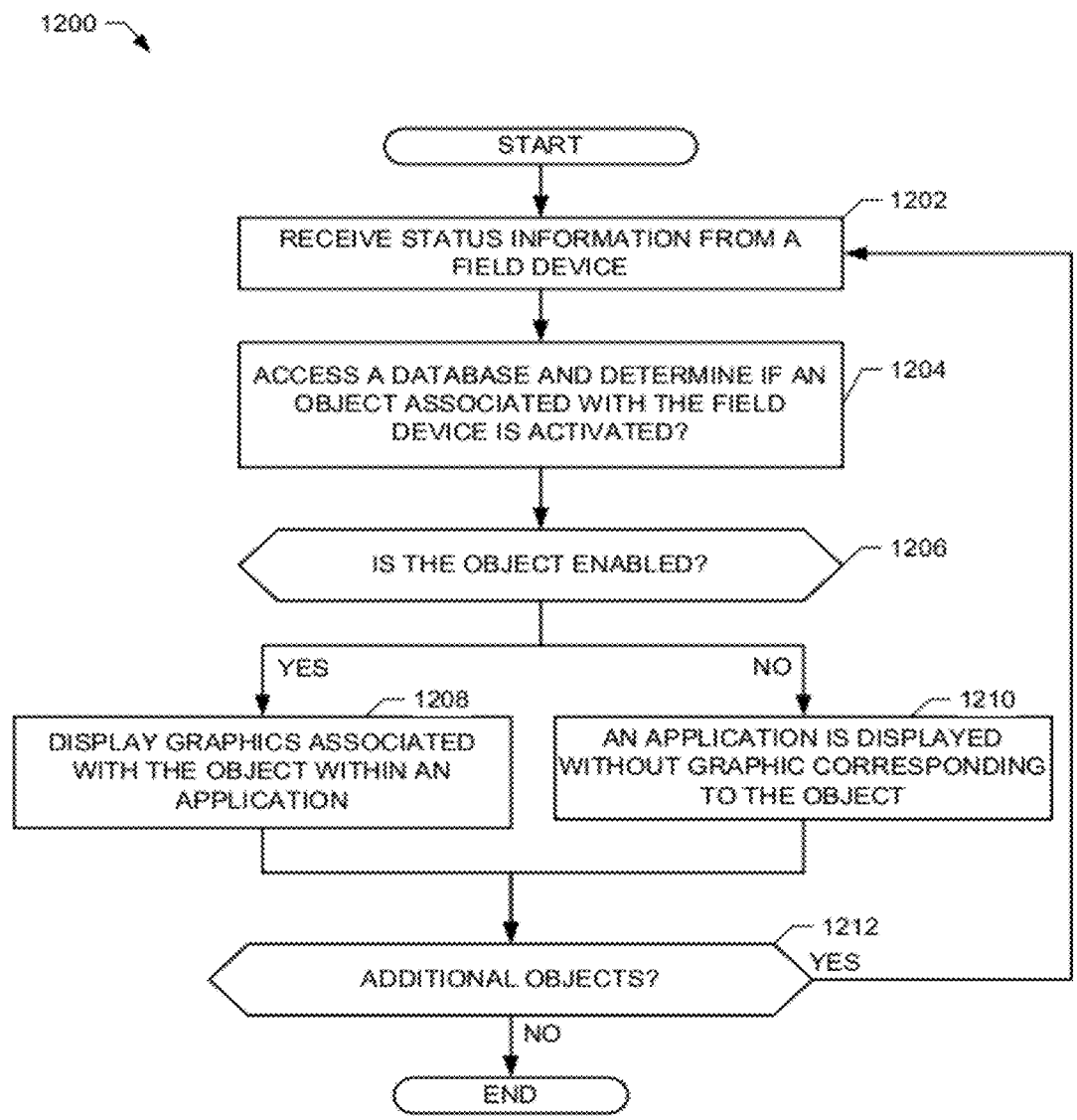

The example process 1200 of FIG. 12 manages which graphics are displayed based on process control status information. The example process 1200 begins by receiving status information from a field device (e.g., via the runtime data receiver 204) (block 1202). The status information may be included within runtime data. Further, the status information may include a condition parameter (e.g., a conditional device parameter) and/or statuses of normal block mode elements. In other examples, the process 1200 may access the activation database 220 to determine if a object associated with a field device is activated (e.g., via the conditional graphic manager 218) (block 1204). An object may refer to a component, a configuration block, a parameter, a block mode element, a feature, and/or a function associated with the field device.

The example process 1200 then determines if an object of the field device is enabled (e.g., via the conditional graphic manager 218). Enabled may include activated, available, and/or licensed. The example process 1200 may determine if an object is enabled based on information within a condition parameter and/or if normal block mode elements associated with the object have a status of automatic. Additionally, the example process 1200 may determine if configuration blocks associated with the object are enabled.

If the object is enabled, the example process 1200 displays graphic(s) associated with the object within one or more applications (e.g., via the renderer 210) (block 1208). However, if the object is not enabled, the example process 1200 removes and/or hides graphic(s) associated with the object from application(s) (e.g., via the renderer 210) (block 1210). The example process 1200 then determines if there are any additional objects (e.g., via the conditional graphic manager 218) (block 1212). In other examples, the process 1200 may process all objects and/or field devices concurrently. If there are additional objects, the example process 1200 returns to receiving status information to determine if graphics associated with those additional objects should be displayed. However, if there are not any additional objects, the example process 1200 terminates.

Figure 13:
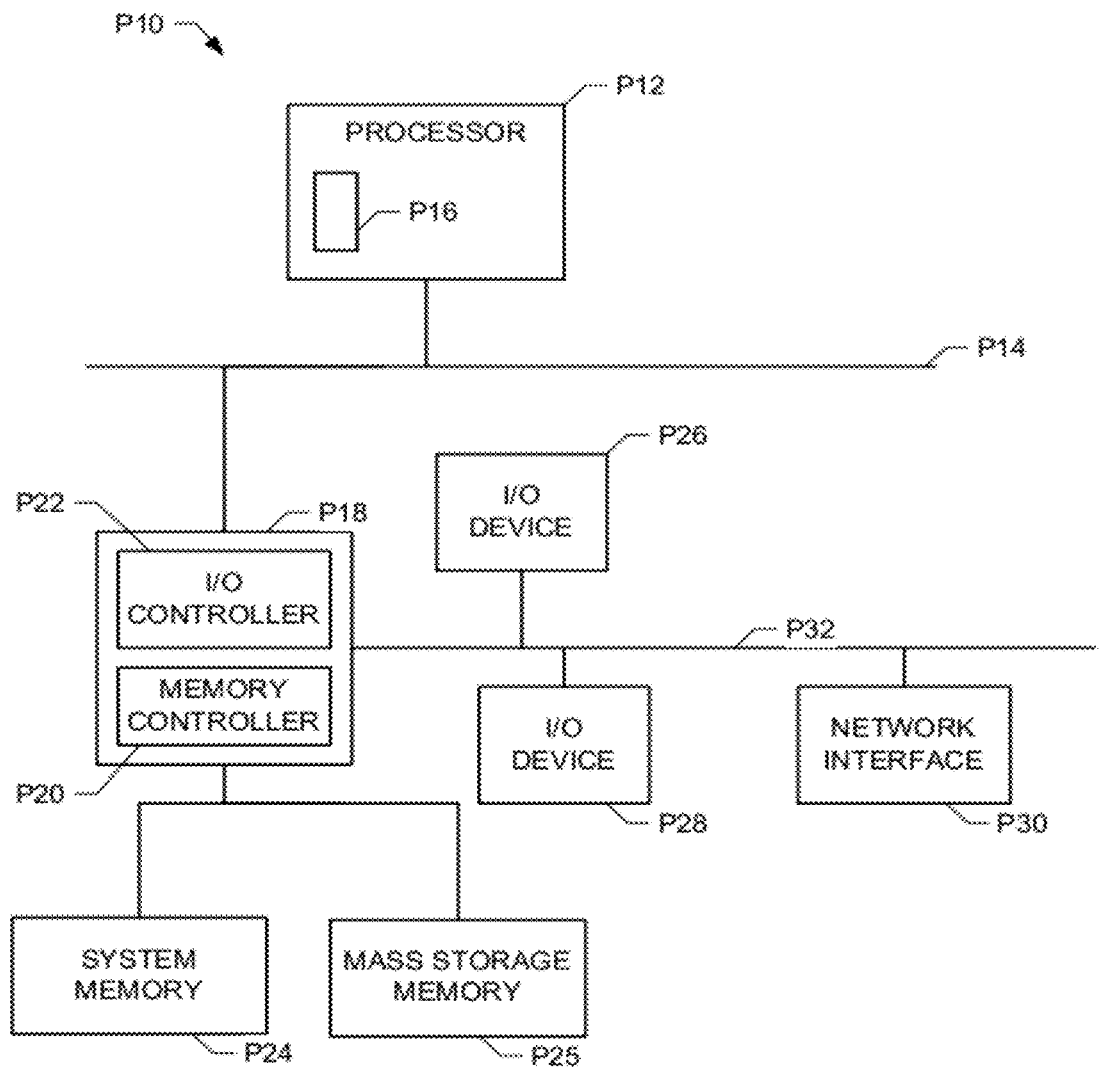
FIG. 13 is a block diagram of an example processor system that may be used to implement the example methods and apparatus described herein.

FIG. 13 is a block diagram of an example processor system P10 that may be used to implement the example methods and apparatus described herein. For example, processor systems similar or identical to the example processor system P10 may be used to implement the example controller interface 202, the example runtime data receiver 204, the example block mode element parser 206, the example cross-block processor 207, the example mode calculator 208, the example renderer 210, the example application interface 212, the example selection receiver 214, the example mode selector 216, the example conditional graphic manager 218, the example activation database 220, the example device descriptor database 120, and/or more generally, the example interface processor 102 of FIGS. 1 and/or 2. Although the example processor system P10 is described below as including a plurality of peripherals, interfaces, chips, memories, etc., one or more of those elements may be omitted from other example processor systems used to implement one or more of the example controller interface 202, the example runtime data receiver 204, the example block mode element parser 206, the example crossblock processor 207, the example mode calculator 208, the example renderer 210, the example application interface 212, the example selection receiver 214, the example mode selector 216, the example conditional graphic manager 218, the example activation database 220, the example device descriptor database 120, and/or more generally, the example interface processor 102.

As shown in FIG. 13, the processor system P10 includes a processor P12 that is coupled to an interconnection bus P14. The processor P12 includes a register set or register space P16, which is depicted in FIG. 13 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 13, the system P10 may be a multi-processor system and, thus, may include one or more additional processors that are identical or similar to the processor P12 and that are communicatively coupled to the interconnection bus P14.

The processor P12 of FIG. 13 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the device descriptor database 120 and/or the activation database 220 (FIG. 2), the mass storage memory P25 may include a hard disk drive, an optical drive, a tape storage device, etc. Alternatively, if the example processor system P10 is used to implement the device descriptor database 120 and/or the activation database 220, the mass storage memory P25 may include a solid-state memory (e.g., a flash memory, a RAM memory, etc.), a magnetic memory (e.g., a hard drive), or any other memory suitable for mass storage in the device descriptor database 120 and/or the activation database 220.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 13 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to display process control information, the method comprising:
  receiving a conditional device parameter in a processor from a process control device operating in a process control system;
  determining if a functionality associated with the process control device is available based on the conditional device parameter;
  displaying a graphic associated with the functionality via a user interface if the conditional device parameter indicates the functionality is available, the graphic representative of process control information generated by the process control device implementing the functionality; and removing the graphic from the user interface if the conditional device parameter indicates the functionality is unavailable to reduce a number of graphics associated with the process control device presented to a user.

2. A method as defined in claim 1, wherein determining if the functionality is available includes accessing a device descriptor associated with the process control device to determine if the functionality is enabled.

3. A method as defined in claim 1, wherein determining if the functionality is available includes accessing a license library to determine if the functionality is licensed.

4. A method as defined in claim 1, further comprising:
determining whether a second conditional device parameter indicates a second functionality associated with the process control device is available;
displaying a second graphic associated with the second functionality via the user interface if the second conditional device parameter indicates the second functionality is available; and
removing the second graphic from the user interface if the second conditional device parameter indicates the second functionality is not available.

5. A method as defined in claim 1, further comprising determining that the functionality associated with the process control device is not available based on the functionality being deactivated.

6. A method as defined in claim 1, wherein the conditional device parameter corresponds to at least one of a component of the process control device, a feature of the process control device, a function of the process control device, or a configuration block included within the process control device.

7. A method as defined in claim 1, further comprising:
receiving a second conditional device parameter from a second process control device;
determining if the functionality is available based on the conditional device parameter and the second conditional device parameter; and
displaying the graphic within the user interface if the functionality is available.

8. A method as defined in claim 1, wherein the conditional device parameter is specified within an electronic device description language file within at least one of the process control device or a workstation that includes the user interface.

9. A method to display process control information, the method comprising:
receiving a conditional device parameter in a processor from a process control device;
determining if a functionality associated with the process control device is available based on the conditional device parameter, wherein determining if the functionality is available includes determining if a block mode element associated with the conditional device parameter has an appropriate status;
displaying a graphic associated with the functionality via a user interface if the functionality is available; and
removing the graphic if the functionality is unavailable.

10. A method to display process control information, the method comprising:
receiving a conditional device parameter in a processor from a process control device;
determining if a functionality associated with the process control device is available based on the conditional device parameter, wherein determining if the functionality is not available includes determining if a normal block mode element associated with the conditional device parameter has a predefined status;
displaying a graphic associated with the functionality via a user interface if the functionality is available; and
removing the graphic if the functionality is unavailable.

11. An apparatus comprising:
a computer readable storage medium to implement a runtime data receiver to receive a conditional device parameter from a process control device operating in a process control system; and
a conditional graphic manager, implemented via the computer readable storage medium, to determine if at least one graphic associated with operation of the process control device is to be displayed within a user interface based on the conditional device parameter, the at least one graphic representative of process control information generated from implementing components of the process control device associated with the conditional device parameter, the conditional device parameter indicating which of the components of the process control device are at least one of activated, licensed, or available.

12. An apparatus as defined in claim 11, further comprising a renderer to display the at least one graphic if the conditional graphic manager determines the at least one graphic is to be displayed.

13. An apparatus comprising:
a computer readable storage medium to implement a runtime data receiver to receive a conditional device parameter from a process control device; and
a conditional graphic manager, implemented via the computer readable storage medium, to determine if at least one graphic associated with the conditional device parameter is to be displayed within a user interface based on the conditional device parameter, the at least one graphic representative of process control information generated from implementing components of the process control device associated with the conditional device parameter, wherein the conditional graphic manager is to determine if the at least one graphic is to be displayed by accessing a database to determine which of the components associated with the conditional device parameter are enabled.

14. An apparatus comprising:
a computer readable storage medium to implement a runtime data receiver to receive a conditional device parameter from a process control device; and
a conditional graphic manager, implemented via the computer readable storage medium, to determine if at least one graphic associated with the conditional device parameter is to be displayed within a user interface based on the conditional device parameter, the at least one graphic representative of process control information generated from implementing components of the process control device associated with the conditional device parameter, wherein the conditional graphic manager is to determine if the at least one graphic is to be displayed by determining if a normal block mode element associated with the conditional device parameter has a predefined status.

15. An apparatus comprising:
a computer readable storage medium to implement a runtime data receiver to receive a conditional device parameter from a process control device operating in a process control system; and
a conditional graphic manager, implemented via the computer readable storage medium, to determine if at least one graphic associated with operation of the process control device is to be displayed within a user interface based on the conditional device parameter, the at least one graphic representative of process control information generated from implementing components of the process control device associated with the conditional device parameter, wherein the conditional graphic manager is to remove the at least one graphic from being displayed if the conditional graphic manager determines that at least one of the components of the process control device associated with the conditional device parameter is disabled.

16. A tangible article of manufacture storing machine-readable instructions that, when executed, cause a machine to at least:
receive a conditional device parameter from a process control device operating in a process control system, the conditional device parameter conditioned on an availability of a process control device functionality of the process control device;
determine if a graphic is available for display via a user interface based on the availability of the process control device functionality indicated by the conditional device parameter, the graphic representative of process control information generated by the process control device implementing the process control device functionality of the process control device;
display the graphic within the user interface if the conditional device parameter indicates the process control device functionality is available; and
remove the graphic from display within the user interface if the conditional device parameter indicates the process control device functionality is not available to reduce a number of graphics associated with the process control device presented to a user.

17. A tangible article of manufacture as defined in claim 16, wherein the machine-readable instructions, when executed, cause the machine to determine if the process control device functionality is available by accessing a device descriptor associated with the process control device to determine if the process control device functionality is enabled.

18. A tangible article of manufacture storing machine-readable instructions that, when executed, cause a machine to at least:
receive a conditional device parameter from a process control device, the conditional device parameter conditioned on an availability of a process control device functionality of the process control device;
determine if a graphic is available for display via a user interface based on the availability of the process control device functionality indicated by the conditional device parameter, the graphic representative of process control information associated with the process control device, wherein the machine-readable instructions, when executed, cause the machine to determine if the process control device functionality is available by determining if a normal block mode element associated with the conditional device parameter has a predetermined status;
display the graphic within the user interface if the process control device functionality is available; and
remove the graphic from display within the user interface if the process control device functionality is not available.

* * * * *